(12) United States Patent
Katiyar et al.

(10) Patent No.: US 11,842,213 B2
(45) Date of Patent: Dec. 12, 2023

(54) COOLING-POWER-UTILIZATION-BASED WORKLOAD ALLOCATION SYSTEM

(71) Applicant: Dell Products L.P., Round Rock, TX (US)

(72) Inventors: Shivendra Katiyar, Bangalore (IN); Naman Goel, Bangalore (IN); Rishi Mukherjee, Bangalore (IN); Ravishankar Kanakapura Nanjundaswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 17/232,400

(22) Filed: Apr. 16, 2021

(65) Prior Publication Data
US 2022/0334874 A1 Oct. 20, 2022

(51) Int. Cl.
*G06F 9/46* (2006.01)
*G06F 9/48* (2006.01)
*G06F 9/54* (2006.01)
*G06F 9/50* (2006.01)

(52) U.S. Cl.
CPC ............ *G06F 9/4893* (2013.01); *G06F 9/505* (2013.01); *G06F 9/5088* (2013.01); *G06F 9/542* (2013.01); *G06F 2209/541* (2013.01)

(58) Field of Classification Search
CPC ...... G06F 9/4893; G06F 9/505; G06F 9/5088; G06F 9/542; G06F 2209/541
See application file for complete search history.

(56) References Cited

U.S. PATENT DOCUMENTS

| 8,127,298 B2 * | 2/2012 | Kato | G06F 1/206 713/320 |
| 2009/0276781 A1 * | 11/2009 | Chan | G06F 9/4881 718/103 |
| 2009/0327778 A1 * | 12/2009 | Shiga | G06F 1/3203 713/320 |

(Continued)

OTHER PUBLICATIONS

Meng et al, Simulation and optimization of HPC job allocation for jointly reducing communication and cooling costs, 2014, Elsevier Inc., 10 pages. (Year: 2014).*

(Continued)

*Primary Examiner* — Diem K Cao
(74) *Attorney, Agent, or Firm* — Joseph Mencher

(57) ABSTRACT

A cooling-power-consumption-based workload allocation system includes a workload allocation system coupled to at least one client device and a plurality of server devices. The workload allocation system receives a first workload request that identifies a first workload from the at least one client device, and determines a first workload priority of the first workload relative to a second workload priority of each second workload being performed by the plurality of server devices. Based on the first workload priority of the first workload relative to the second workload priority of each second workload and a cooling-power-utilization-efficiency ranking of each of the plurality of server devices, the workload allocation system identifies a first server device included in the plurality of server devices for performing the first workload, and causes the first server device to perform the first workload.

20 Claims, 18 Drawing Sheets

(56) References Cited

U.S. PATENT DOCUMENTS

| | | | |
|---|---|---|---|
| 2013/0152097 A1* | 6/2013 | Boctor | G06F 9/505 718/103 |
| 2013/0254778 A1* | 9/2013 | Lakshmanan | G06F 9/5094 718/105 |
| 2021/0081020 A1* | 3/2021 | Ghose | G06F 1/20 |

OTHER PUBLICATIONS

Kaplan et al., Optimizing Communication and Cooling Costs in HPC Data Centers via Intelligent Job Allocations, 2013, IEEE, 10 pages. (Year: 2013).*

* cited by examiner

COOLING-POWER-UTILIZATION-BASED WORKLOAD ALLOCATION SYSTEM

BACKGROUND

The present disclosure relates generally to information handling systems, and more particularly to allocating workloads to information handling systems based on cooling power utilization.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, networking devices, storage systems, and/or other computing devices know in the art, are sometimes provided in datacenters in order to perform workloads for client devices. In conventional air-cooled datacenters, the power used to cool the computing devices can be a substantial amount of the total power utilized by the datacenter, particularly when those computing devices perform relatively processing-intensive workloads. Power consumption in a datacenter may generally be divided into two categories: Information Technology (IT) infrastructure power consumption (e.g., e.g., the power consumed by the server devices, networking devices, and storage systems discussed above), and facility power consumption (e.g., the power consumed by lighting, cooling, ventilation, power subsystems, and/or other facility components in the datacenter etc.) However, conventional datacenters do not provide a cohesive view and/or detailed information about datacenter power consumption, as IT administrators and facility management are often disconnected.

As such, power is often not optimally allocated for cooling IT infrastructure operating to perform workloads, workloads are not allocated to computing devices or balanced between computing devices in a manner that provides the most efficient cooling in the datacenter, redundant computing devices consume power even when their redundant functionality is not required, power is allocated for cooling computing devices performing workloads without consideration of the applications that requested those workloads and/or demand forecasts for those applications/workloads, as well as a variety of other issues that would be apparent to one of skill in the art in possession of the present disclosure. Conventional workload allocation systems (e.g., the VSPHERE® Distributed Resource Scheduler (DRS) available from VMWARE® Inc. of Palo Alto, California, United States; the AMAZON WEB SERVICES® (AWS) Load Balancer available from AMAZON.COM Inc. of Seattle Washington, United States; the AZURE® Load Balancer available from MICROSOFT Corporation of Redmond, Washington, United States; RED HAT OPENSHIFT® available from RED HAT, Inc., of Raleigh, North Carolina, United States, etc.) provide workload-balancing by considering attributes about computing device health and/or using server resource thresholds, but do not consider cooling power utilization as part of their workload balancing functionality. As such, conventional workload allocation systems may be power-inefficient with regard to the cooling of IT infrastructure in datacenters.

Accordingly, it would be desirable to provide a workload allocation system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a workload allocation engine that is configured to: receive, from at least one client device, a first workload request that identifies a first workload; determine a first workload priority of the first workload relative to a second workload priority of each second workload being performed by a plurality of server devices; identify, based on the first workload priority of the first workload relative to the second workload priority of each second workload and a cooling-power-utilization-efficiency ranking of each of the plurality of server devices, a first server device included in the plurality of server devices for performing the first workload; and cause the first server device to perform the first workload.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
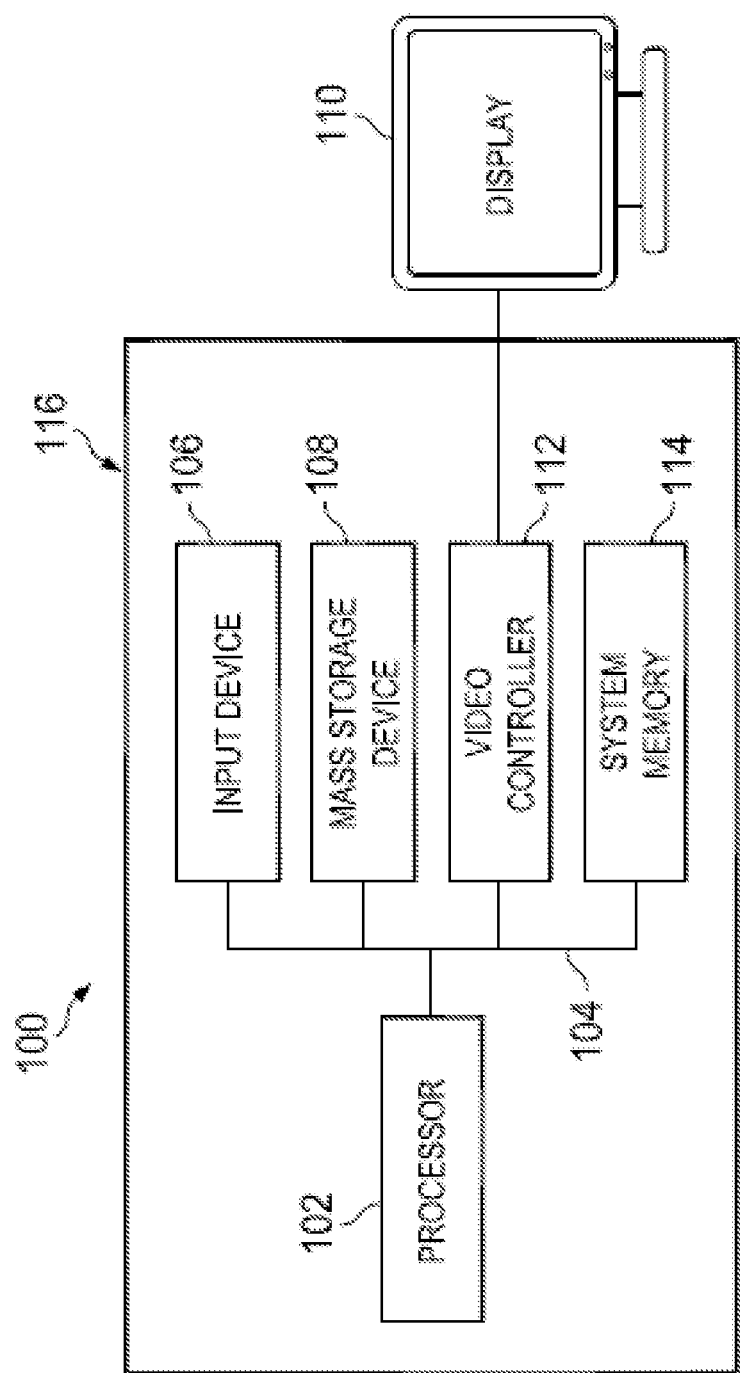
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
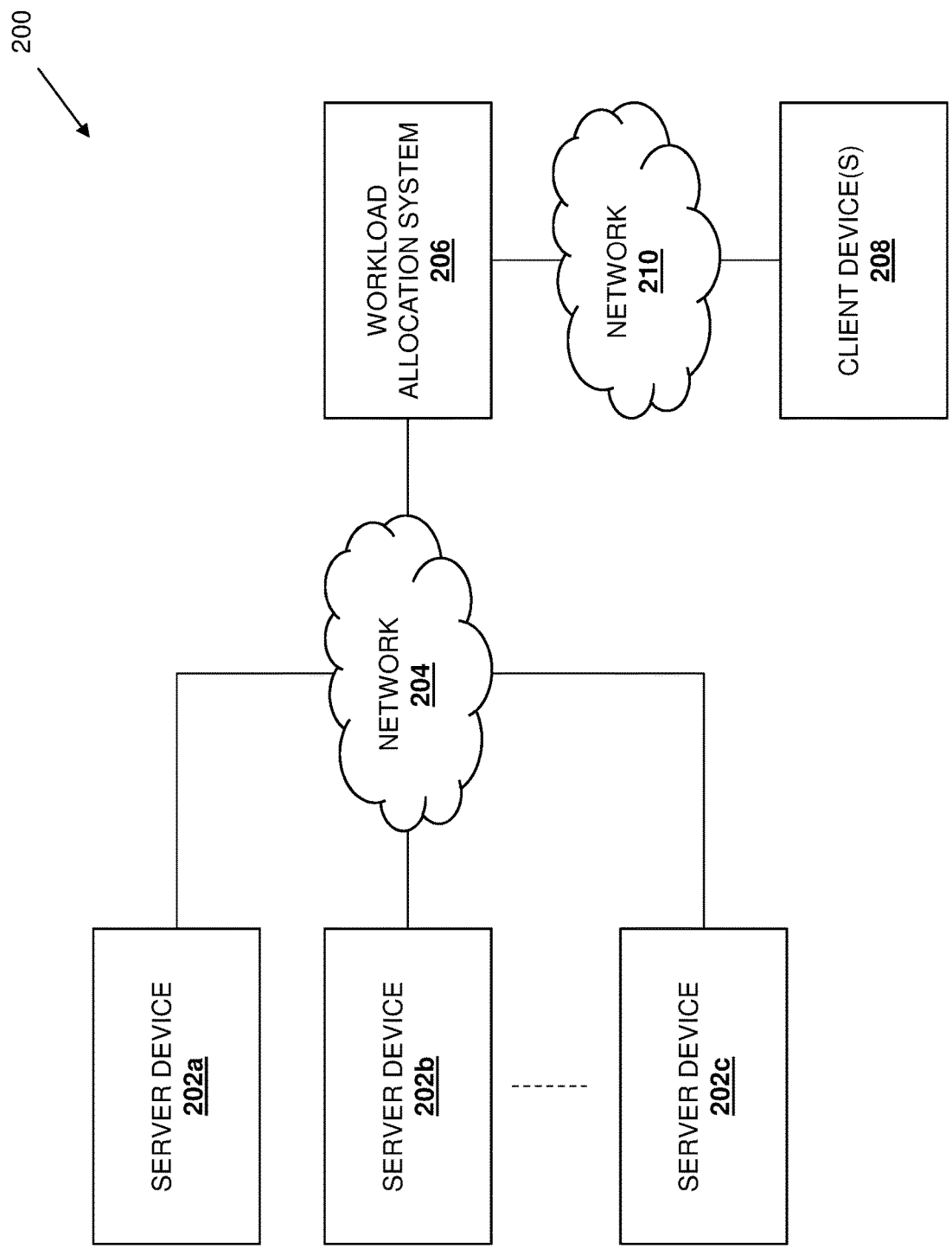
FIG. 2 is a schematic view illustrating an embodiment of a networked system.

Referring now to FIG. 2, an embodiment of a networked system 200 is illustrated. In the illustrated embodiment, the networked system 200 includes a plurality of server devices 202a, 202b, and up to 202c. In an embodiment, any or all of the server devices 202a-202c may be provided by the IHS 100 discussed above with reference to FIG. 1, and/or may include some or all of the components of the IHS 100, and in the specific examples below are included in a datacenter. However, while illustrated and discussed as being provided by server devices in a datacenter, one of skill in the art in possession of the present disclosure will recognize that other computing devices (networking devices, storage systems, etc.) may be provided in a variety of networked systems and may utilize the cooling-power-utilization-based workload allocation system of the present disclosure while remaining within its scope as well. In the illustrated embodiment, each of the server devices 202a-202c are coupled to a network 204 that may be provided by a Local Area Network (LAN), the Internet, combinations thereof, and/or other networks that would be apparent to one of skill in the art in possession of the present disclosure.

In the illustrated embodiment, a workload allocation system 206 is also coupled to the network 204. In an embodiment, the workload allocation system 206 may be provided by the IHS 100 discussed above with reference to FIG. 1, and/or may include some or all of the components of the IHS 100, and in specific examples may be provided by one or more server devices that are configured to perform the cooling-power-utilization-based workload allocation functionality discussed below. However, while illustrated and discussed as being provided by server devices, one of skill in the art in possession of the present disclosure will recognize that the cooling-power-utilization-based workload allocation functionality of the present disclosure may be provided using a variety of devices that are configured to operate similarly as the workload allocation system 206 discussed below. In the illustrated embodiment, the workload allocation system 206 is coupled to a network 210 that may be provided by a Local Area Network (LAN), the Internet, combinations thereof, and/or other networks that would be apparent to one of skill in the art in possession of the present disclosure.

In the illustrated embodiment, one or more client devices 208 are coupled to the network 210 and may be provided by the IHS 100 discussed above with reference to FIG. 1, may include some or all of the components of the IHS 100, and in specific examples may be provided by server devices, desktop computing devices, laptop/notebook computing devices, tablet computing devices, mobile phones, and/or any other client computing devices that would be apparent to one of skill in the art in possession of the present disclosure. However, while a specific networked system 200 has been illustrated and described, one of skill in the art in possession of the present disclosure will recognize that the cooling-power-utilization-based workload allocation system of the present disclosure may include a variety of components and component configurations while remaining within the scope of the present disclosure as well.

Figure 3:
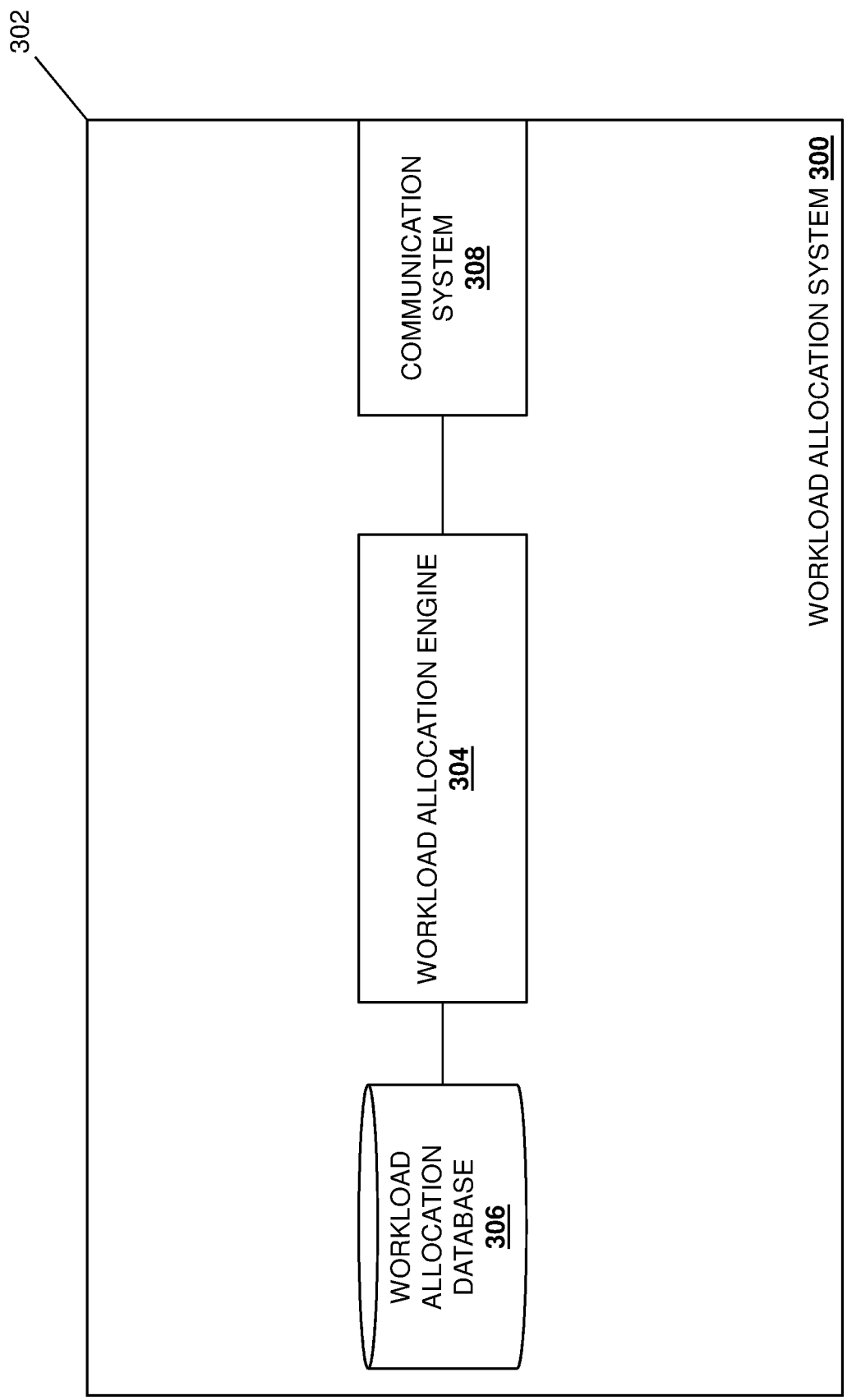
FIG. 3 is a schematic view illustrating an embodiment of a workload allocation system that may be provided in the networked system of FIG. 2.

Referring now to FIG. 3, an embodiment of a workload allocation system 300 is illustrated that may provide the workload allocation system 206 discussed above with reference to FIG. 2. As such, the workload allocation system 300 may be provided by the IHS 100 discussed above with reference to FIG. 1 and/or may include some or all of the components of the IHS 100, and in specific examples, may be provided by one or more server devices. However, while illustrated and discussed as being provided by one or more server devices, one of skill in the art in possession of the present disclosure will recognize that the functionality of the workload allocation system 300 discussed below may be provided by other devices that are configured to operate similarly as the workload allocation system 300 discussed below. In the illustrated embodiment, the workload allocation system 300 includes a chassis 302 that houses the components of the workload allocation system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a workload allocation engine 304 that is configured to perform the functionality of the workload allocation engines and/or workload allocation systems discussed below.

The chassis 302 may also house a storage system (not illustrated, but which may include the storage 108 discussed above with reference to FIG. 1) that is coupled to the workload allocation engine 304 (e.g., via a coupling between the storage system and the processing system) and that includes a workload allocation database 306 that is configured to store any of the information utilized by the workload allocation engine 304 discussed below. The chassis 302 may also house a communication system 308 that is coupled to the workload allocation engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific workload allocation system 300 has been illustrated and described, one of skill in the art in possession of the present disclosure will recognize that workload allocation systems (or other devices operating according to the teachings of the present disclosure in a manner similar to that described below for the workload allocation system 300) may include a variety of components and/or component configurations for providing conventional workload allocation device functionality, as well as the functionality discussed below, while remaining within the scope of the present disclosure as well. For example, the workload allocation engine 304 may include a server cluster coordinator for a server cluster that includes the server devices 202a-202c, with that server cluster coordinator also configured to perform the cooling-power-utilization-based workload allocation functionality discussed below.

Figure 4:
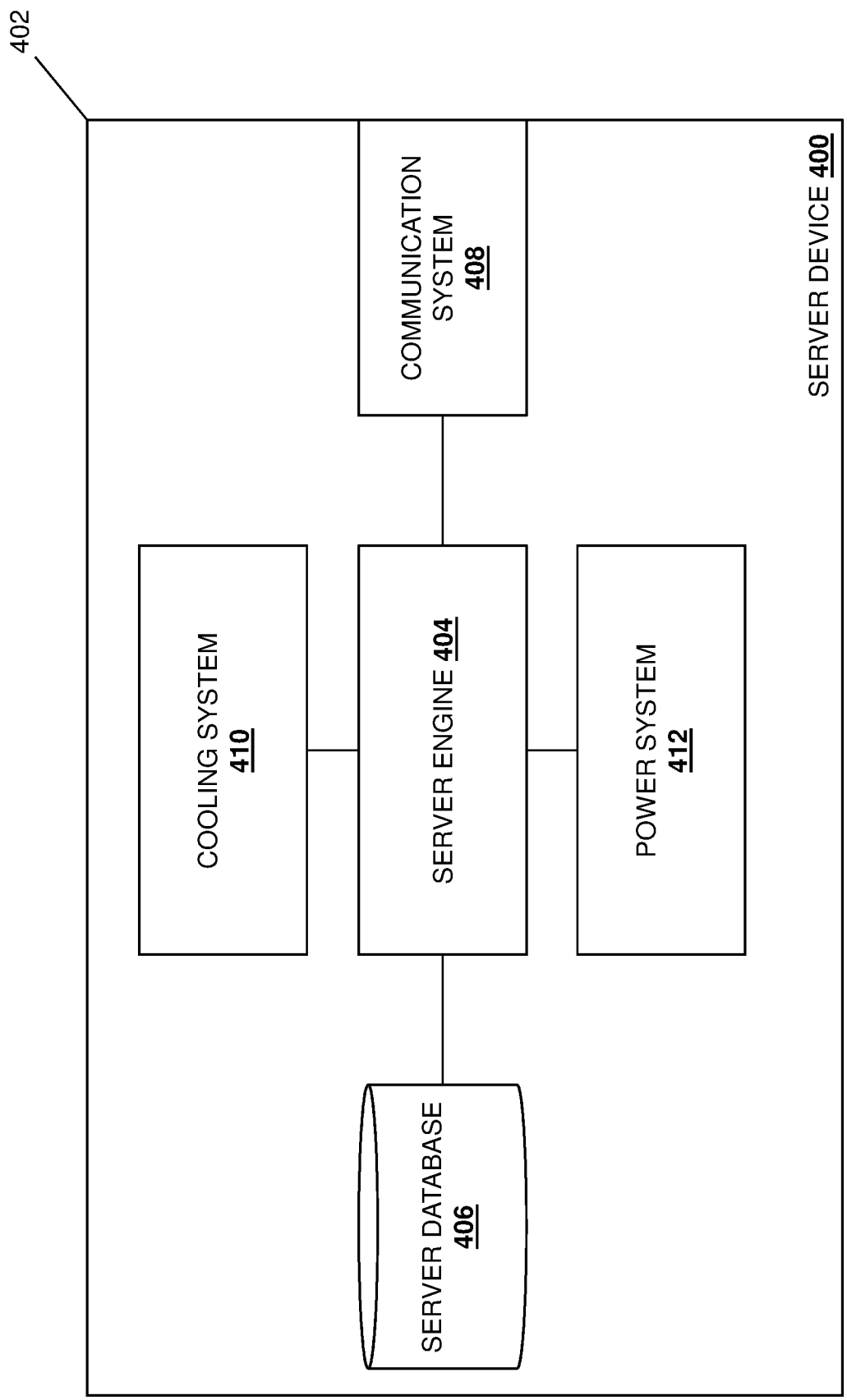
FIG. 4 is a schematic view illustrating an embodiment of a server device that may be provided in the networked system of FIG. 2.

Referring now to FIG. 4, an embodiment of a server device 400 is illustrated that may provide any or all of the server devices 202a-202c discussed above with reference to FIG. 2. As such, the server device 400 may be provided by the IHS 100 discussed above with reference to FIG. 1 and/or may include some or all of the components of the IHS 100, and in the examples below is included in a datacenter. However, while illustrated and discussed as a server device in a datacenter, one of skill in the art in possession of the present disclosure will recognize that the server device 400 discussed below may be replaced by other computing devices (e.g., networking devices, storage systems, etc.) that are included in other locations and configured to operate similarly as the server device 400 discussed below to perform workloads. In the illustrated embodiment, the server device 400 includes a chassis 402 that houses the components of the server device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a server engine 404 that is configured to perform the functionality of the server engines and/or server devices discussed below.

The chassis 402 may also house a storage system (not illustrated, but which may include the storage 108 discussed above with reference to FIG. 1) that is coupled to the server engine 404 (e.g., via a coupling between the storage system and the processing system) and that includes a server database 406 that is configured to store any of the information utilized by the server engine 404 discussed below. The chassis 202 may also house a communication system 408 that is coupled to the server engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

The chassis 402 may also include a cooling system 410 that is coupled to the server engine 404 (e.g., via a coupling between the cooling system 410 and the processing system) and that may include fan systems, temperature sensors, and/or other cooling components that would be apparent to one of skill in the art in possession of the present disclosure. The chassis 402 may also include a power system 412 that is coupled to the server engine 404 (e.g., via a coupling between the power system 412 and the processing system) and that may include Power Supply Units (PSUs), batteries, and/or other power components that would be apparent to one of skill in the art in possession of the present disclosure. However, while a specific server device 400 has been illustrated and described, one of skill in the art in possession of the present disclosure will recognize that server devices (or other computing devices operating according to the teachings of the present disclosure in a manner similar to that described below for the server device 400) may include a variety of components and/or component configurations for providing conventional server device functionality, as well as the functionality discussed below, while remaining within the scope of the present disclosure as well.

Figure 5:
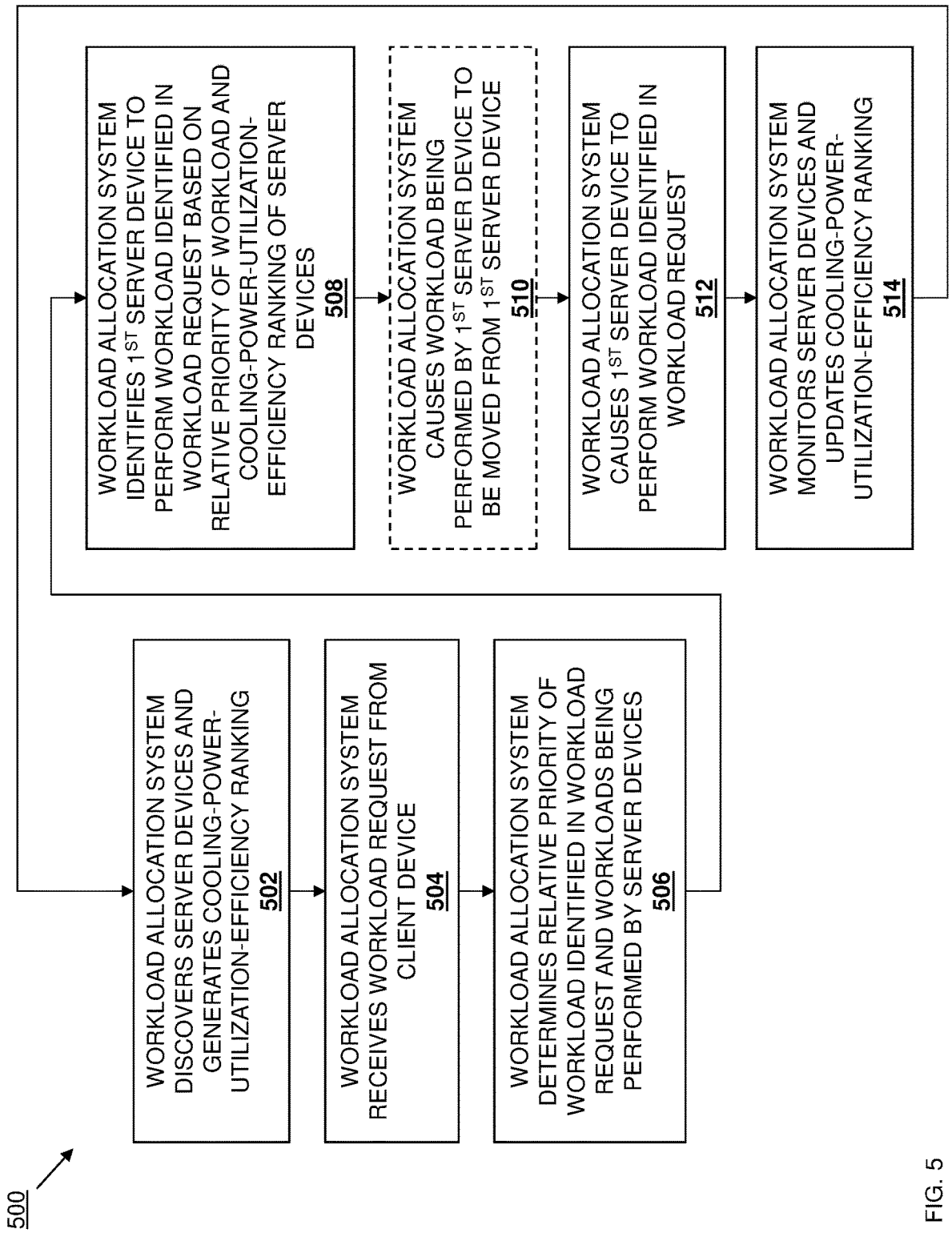
FIG. 5 is a flow chart illustrating an embodiment of a method for cooling-power-utilization-based workload allocation.

Referring now to FIG. 5, an embodiment of a method 500 for cooling-power-utilization-based workload allocation is illustrated. As discussed below, the systems and methods of the present disclosure provide for the allocation of workloads to server devices in consideration of the power utilized by those server devices to cool their components. For example, the cooling-power-consumption-based workload allocation system of the present disclosure includes a workload allocation system coupled to at least one client device and a plurality of server devices. The workload allocation system receives a first workload request that identifies a first workload from the at least one client device, and determines a first workload priority of the first workload relative to a second workload priority of each second workload being performed by the plurality of server devices. Based on the first workload priority of the first workload relative to the second workload priority of each second workload and a cooling-power-utilization-efficiency ranking of each of the plurality of server devices, the workload allocation system identifies a first server device included in the plurality of server devices for performing the first workload, and causes the first server device to perform the first workload. As such, workloads may be prioritized so that higher priority workloads are provided on the most cooling-power-utilization-efficient server devices, which has been found to reduce the inefficient use of cooling power by the server devices and provide for more efficient/lower cost datacenter operation.

Figure 6A:
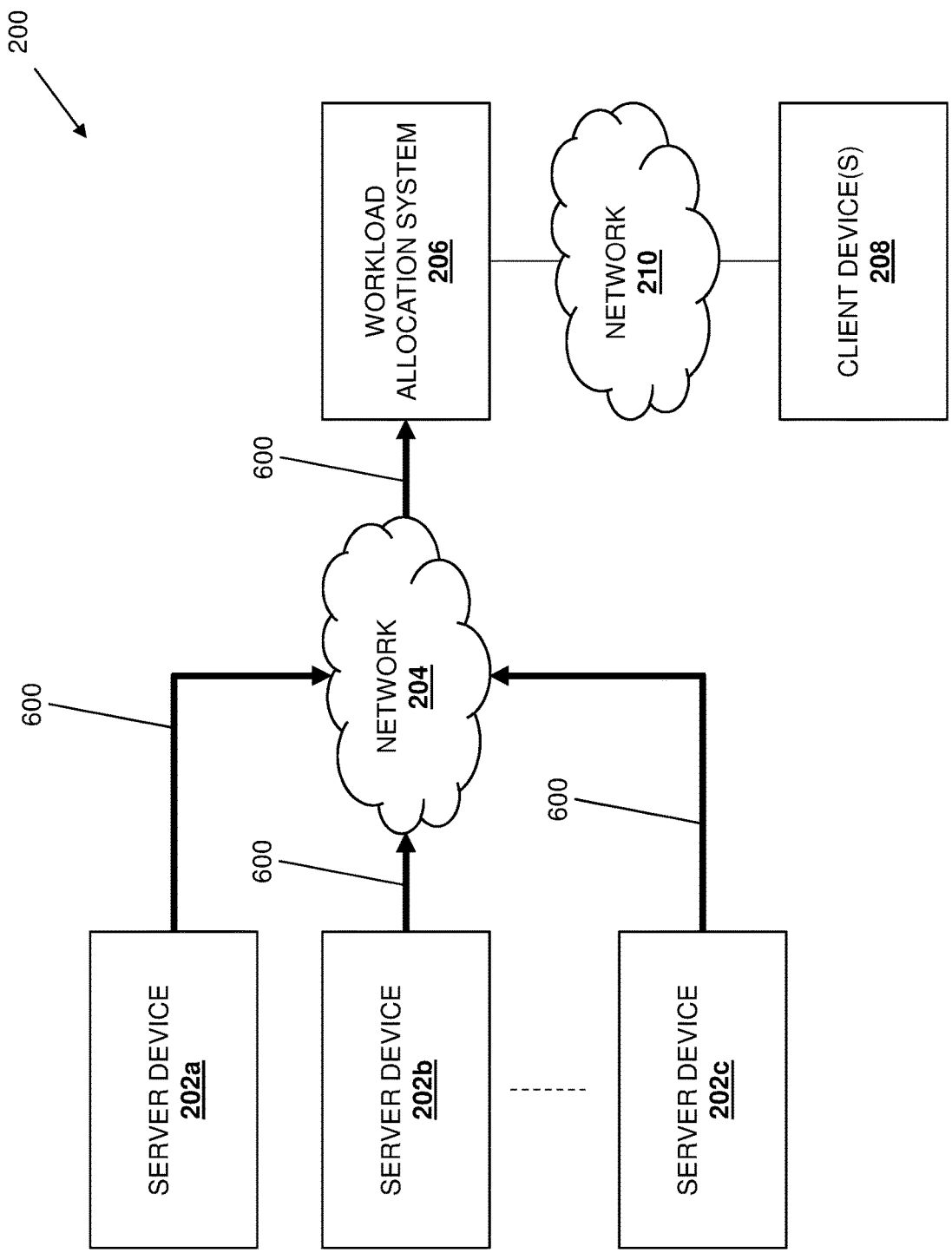
FIG. 6A is a schematic view illustrating an embodiment of the networked system of FIG. 2 operating during the method of FIG. 5.
Figure 6B:
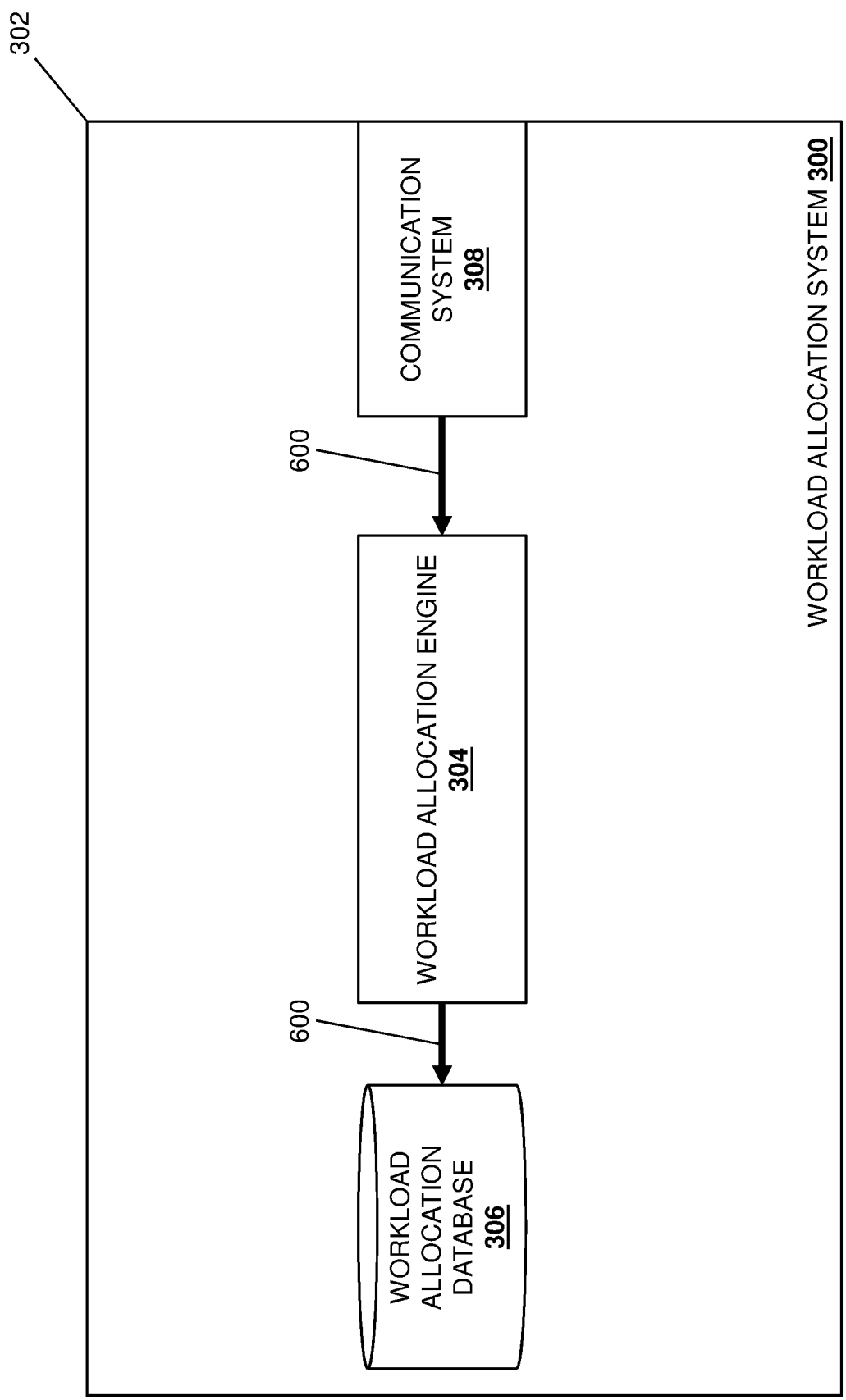
FIG. 6B is a schematic view illustrating an embodiment of the workload allocation system of FIG. 3 operating during the method of FIG. 5.
Figure 6C:
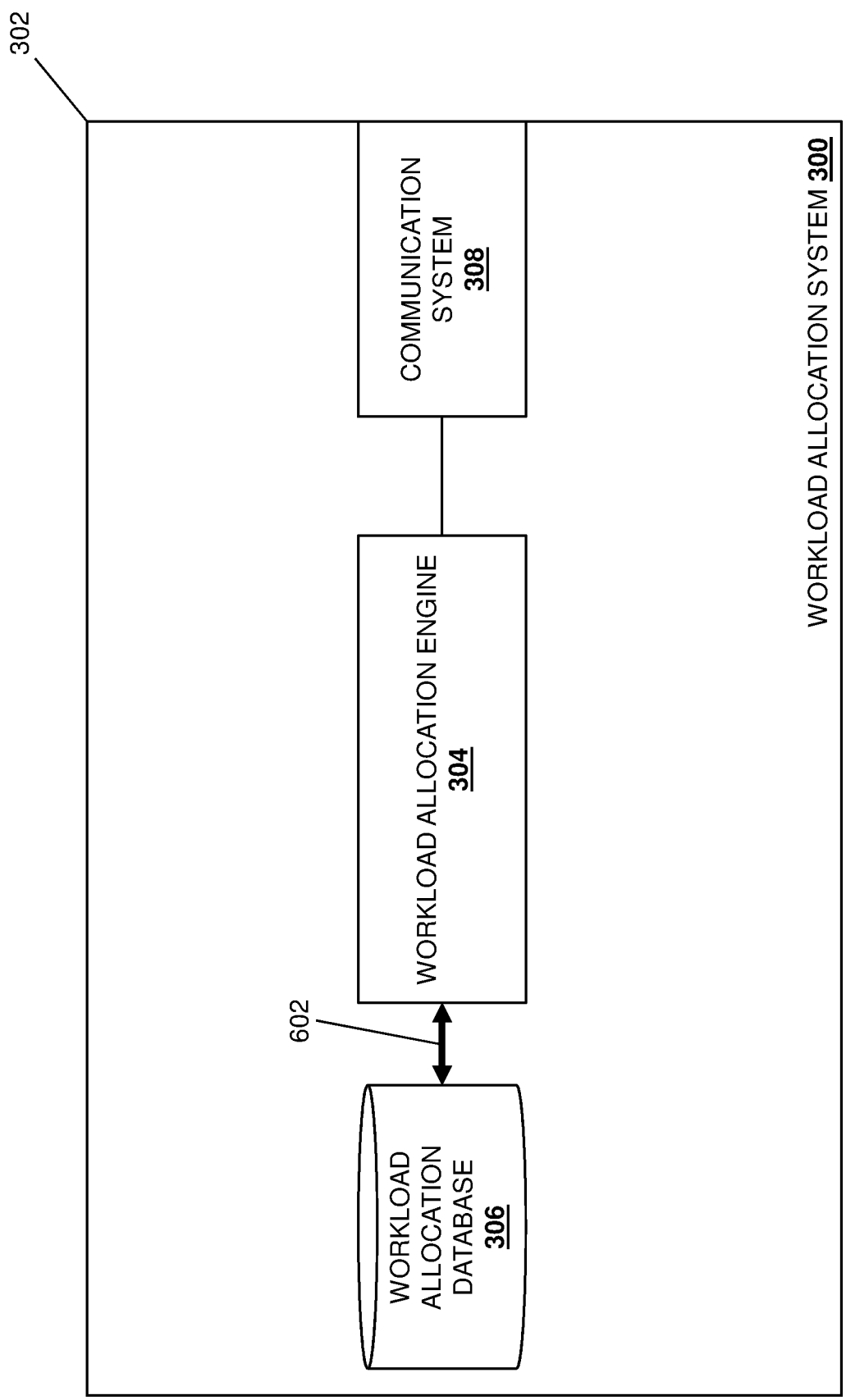
FIG. 6C is a schematic view illustrating an embodiment of the workload allocation system of FIG. 3 operating during the method of FIG. 5.

The method 500 begins at block 502 where a workload allocation system discovers server devices and generates a cooling-power-utilization-efficiency ranking. With reference to FIGS. 6A and 6B, in an embodiment of block 502, the workload allocation engine 304 in the workload allocation system 206/300 may perform server device discovery operations 600 that include exchanging communications through its communication system 308 via the network 204 with the server devices 202a-202c to discover those server devices 202a-202c and retrieve and store information about those server devices 202a-202c in its workload allocation database 306. As will be appreciated by one of skill in the art in possession of the present disclosure, the server engine 404 in the server devices 202a-202c/400 may utilize a variety of discovery techniques known in the art during the server device discovery operations 600 to transmit (or provide access to) any information about that server device (e.g., information stored in its server database 406) to the workload allocation system 206/300. For example, an operating system and/or management controller (e.g., a Baseboard Management Controller (BMC)) in each server device may operate to "push" information about that server device to the workload allocation system 206/300 using a variety of interfaces that would be apparent to one of skill in the art in possession of the present disclosure. With reference to FIG. 6C, in an embodiment of block 502, the workload allocation engine 304 in the workload allocation system 206/300 may then perform cooling-power-utilization-efficiency ranking operations 602 that utilize the information retrieved from the server devices 202a-202c and stored in its workload allocation database 306 to generate a cooling-power-utilization-efficiency ranking for the server devices 202a-202c.

As discussed in further detail below, the generation of the cooling-power-utilization-efficiency ranking for the server devices 202a-202c may identify the relative efficiency of each of the server devices 202a-202c in their utilization of power to provide cooling for that server device, and may be generated in a variety of manners that will fall within the scope of the present disclosure. In some embodiments, each server device 202a-202c may include a device inventory repository that stores information about the power efficiency of that server device, and that information in the device inventory repository may be transmitted to the workload allocation system 206/300 and utilized to generate the cooling-power-utilization-efficiency ranking for the server devices 202a-202c at block 602.

For example, information provided by the server devices 202a-202c to the workload allocation system 206/300 may include one or more vendor-specific benchmark values that have been provided by the vendor of that server device that that identify the results of power efficiency tests for that server device by that vendor (e.g., the vendor-specific benchmark values may be provided in vendor specifications that identify performance efficiency of that server device, power consumed per Cubic Feet per Minute (CFM) airflow rate in that server device, etc.), server model/generation information for that server device that may classify or identify the hardware components and/or capabilities of that server device, telemetry data (e.g., power consumption data, processor utilization data, memory utilization data, Input/Output (I/O) utilization data, cooling system inlet temperature data, cooling system outlet temperature data, cooling system operations (e.g., CFM capabilities of the operation of the cooling system 410), etc.), application load information, and/or any other information that one of skill in the art in possession of the present disclosure will recognize as allowing the cooling-power-utilization efficiency of that server device to be identified or estimated. Furthermore, as discussed below, information such as the telemetry data and application load information may be utilized to dynamically modify the cooling-power-utilization-efficiency ranking for the server devices 202a-202c in real-time.

In some embodiments, the power consumption or power efficiency of any particular server device may be correlated with the cooling of that server device. For example, any of the server devices 202a-202c may include variable-speed fans controlled using cooling algorithms that receive inputs from ambient temperature sensors, component temperature sensors, and/or other temperature sensors included on that server device. Furthermore, one of skill in the art in possession of the present disclosure will appreciate that airflow rate through a server device will be dependent on the inlet ambient air temperature for that server device, with relatively lower inlet ambient air temperatures correlated with relatively lower airflow rates through the server device. As such, in specific examples, the CFM airflow rate through a server device may be predicted/estimated based on the temperature difference between cooling system air intake at the server device and cooling system air exhaust from the server device (in ° C. or ° F.), as well as the power consumed by that server device (in W), using either of the following equations:

Airflow (CFM)=1.78*[power consumption (W)/temperature difference (° C.)]

Airflow (CFM)=3.2*[power consumption (W)/temperature difference (° F.)]

In some specific examples where the temperature difference in the equations above for a server device is not known or determinable (e.g., the temperature sensors in that server device do not provide data (or accurate data) about the cooling system air intake at the server device and the cooling system air exhaust from the server device), the power consumption of that server device may be utilized along with an approximate CFM airflow rate of 9 CFM per 100 W of power consumed (which assumes an air inlet/air outlet temperature difference of approximately 20° C. or 36° F. for the server device). As such, while server devices that are configured to accurately report cooling system air intake and cooling system air exhaust may provide more accurate estimates of the airflow rate through those server devices, the inventors have found that server devices that are not configured to accurately report cooling system air intake and cooling system air exhaust will still benefit from the teachings of the present disclosure based on temperature different estimations like those described above.

Thus, in a specific example, the vendor-provided power efficiency of each server device 202a-202c may be utilized by determining the maximum power consumption that is efficient for that server device, which allows for the determination of the maximum airflow rate that is efficient for that server device (e.g., using the equations above). Using the maximum efficient power consumption/airflow rate for each server device, those server devices may then be ranked by most efficient (e.g., server devices with relatively lower maximum power consumption and relatively higher maximum airflow rate) to least efficient (e.g., server devices with relatively higher maximum power consumption and relatively lower maximum airflow rate) in the cooling-power-utilization-efficiency ranking for the server devices 202a-202c. As will be appreciated by one of skill in the art in possession of the present disclosure, a variety of considerations may be taken into account when ranking the cooling-power-utilization efficiency of the server devices 202a-202c, and any of those considerations may be utilized to perform the relative cooling-power-utilization efficiency ranking of the server devices 202a-202c at block 602. Furthermore, continuing with the examples above, maximum airflow rate thresholds may be determined for each server device and associated with alarms that are configured to activate if that server device is identified to perform a workload that will require an airflow rate above the maximum airflow rate threshold for that server device, discussed in further detail below.

However, while specific techniques for (and examples of) the determination cooling-power-utilization efficiency for server devices and the relatively ranking of those server devices based on their respective cooling-power-utilization efficiencies have been provided, one of skill in the art in possession of the present disclosure will appreciate how the relatively efficiency of the utilization of power for cooling by server devices may be determined in a variety of other manners to provide the cooling-power-utilization-efficiency ranking discussed above. For example, one of skill in the art in possession of the present disclosure will appreciate how relatively newer and/or more expensive server devices may exhibit more efficient utilization of cooling power, while relatively older and/or less expensive server devices may exhibit less efficient utilization of cooling power, and thus those and any other characteristics of server devices that correlate with cooling-power-utilization efficiency (e.g., device cost, device age, device generation, device model, etc.) may be identified and used to generate the cooling-power-utilization-efficiency ranking at block 602 while remaining within the scope of the present disclosure as well.

Thus, following block 602, a cooling-power-utilization-efficiency ranking that ranks the relative cooling-power-utilization efficiency of each of the server devices 202a-202c may be stored in the workload allocation database 306 of the workload allocation system 206/300, with server devices ranked higher in the cooling-power-utilization-efficiency ranking being relatively more power/performance efficient and having a relatively higher throughput, and server devices ranked lower in the cooling-power-utilization-efficiency ranking being relatively less power/performance efficient and having a relatively lower throughput. Furthermore, in some examples, the cooling-power-utilization-efficiency ranking that ranks the relative cooling-power-utilization efficiency of each of the server devices 202a-202c may also take into consideration the total cooling capacity of the networked system 200 (e.g., the total cooling capacity of the datacenter).

As will be appreciated by one of skill in the art in possession of the present disclosure, the total cooling capacity of the networked system (and the power required to support that total cooling capacity) may be defined by a cooling service vendor. For example, 50 CFM of cooling capacity may require 100 W of power, and the knowledge of that total cooling capacity and required cooling power may be utilize to optimally distribute power for cooling. To provide a specific example, if that 100 W of power is distributed between two server devices, each server device may be allocated 50 W of power. A calculation of the CFM cooling capacity that may then be performed for each of those server devices using the equations provided above, and that CFM cooling capacity may be treated as a threshold above which an alarm may be generated (i.e., if one of those server devices attempts to utilize cooling above that threshold.

Figure 7A:
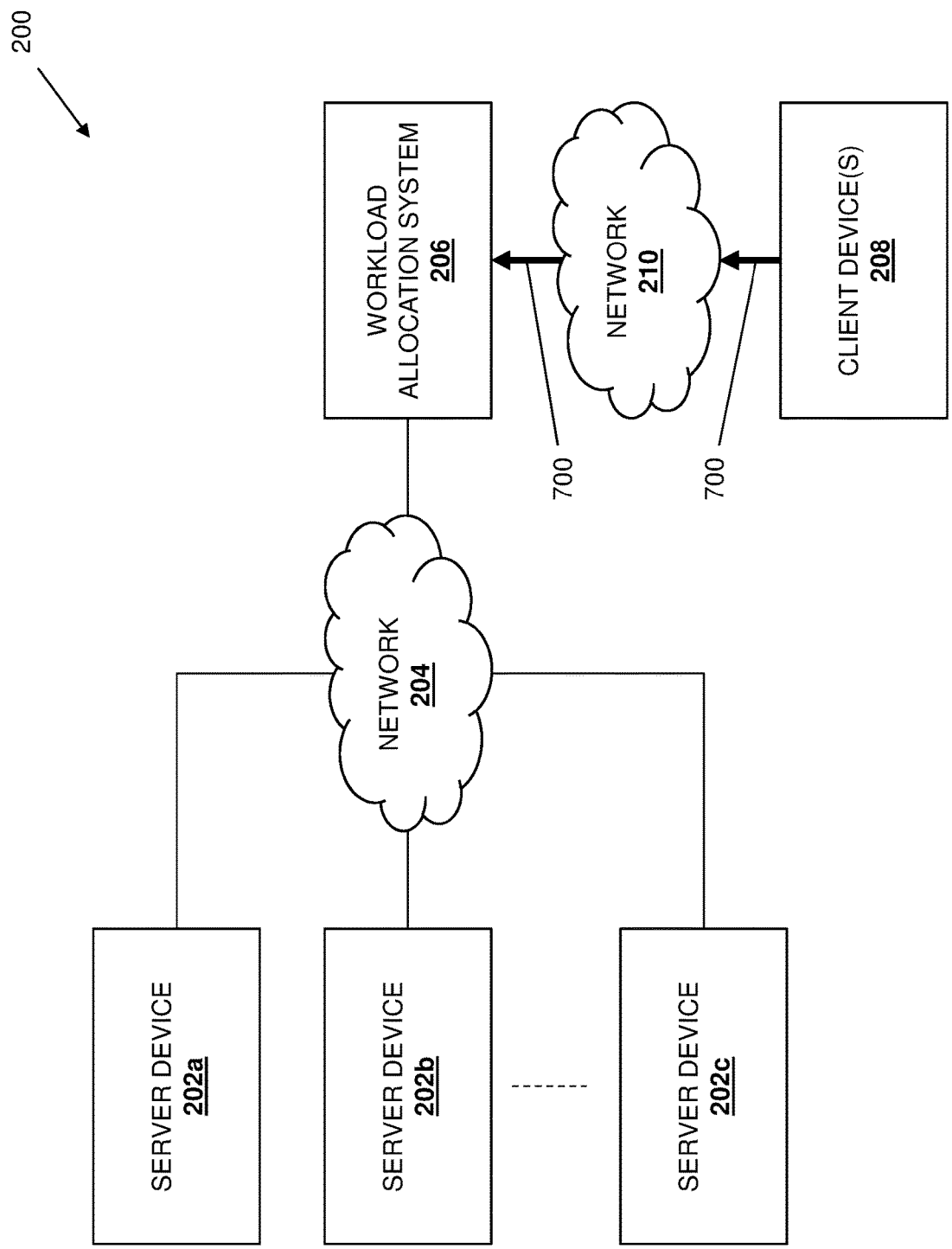
FIG. 7A is a schematic view illustrating an embodiment of the networked system of FIG. 2 operating during the method of FIG. 5.
Figure 7B:
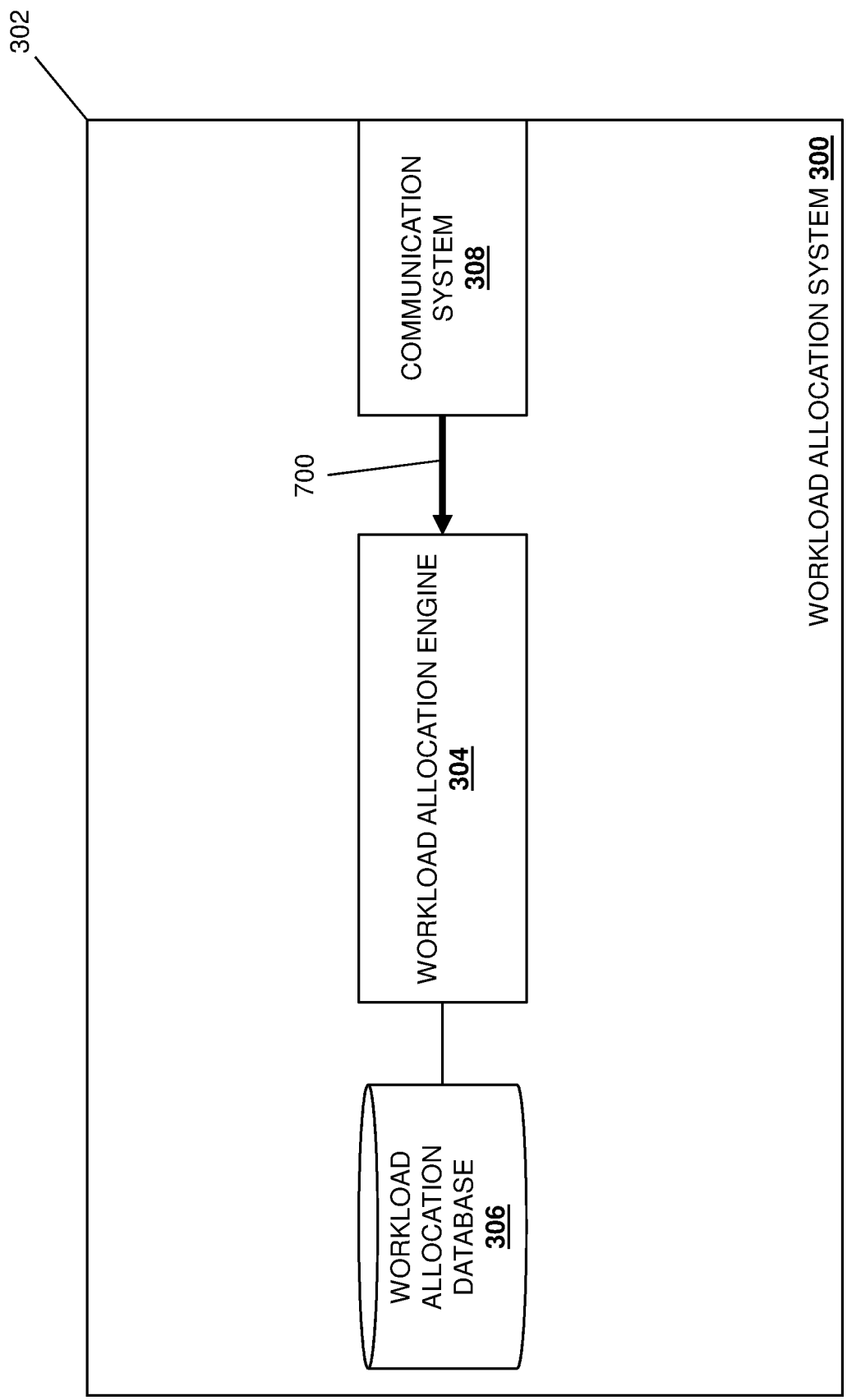
FIG. 7B is a schematic view illustrating an embodiment of the workload allocation system of FIG. 3 operating during the method of FIG. 5.

The method 500 then proceeds to block 504 where the workload allocation system receives a workload request from a client device. With reference to FIGS. 7A and 7B, in an embodiment of block 504, the client device(s) 208 may perform workload request transmission operations 700 that may include generating and transmitting a workload request via the network 210 to the workload allocation system 206 such that the workload allocation engine 304 in the workload allocation system 206/300 receives that workload request via its communication system 308. In the examples below, workload requests provided by the client device(s) 208 to the workload allocation system 206 are generated and transmitted by applications provided by the client device(s) 208, but one of skill in the art in possession of the present disclosure will appreciate that workload requests received by the workload allocation system 206 may be generated and transmitted by a variety of other client device subsystems while remaining within the scope of the present disclosure as well. Thus, some specific examples, the workload request received at block 504 may identify a workload whose performance is being requested, an application requesting that workload, workload/application requirements for the performance of that workload, and/or any other workload request information that one of skill in the art in possession of the present disclosure would recognize as allowing for the functionality discussed below. As will be appreciated by one of skill in the art in possession of the present disclosure, any application/workload information may be provided in the workload request, collected using operating system data generated by an operating system in the client device(s) 208 requesting that workload, and transmitted/received in a variety of other manners known in the art.

The method 500 then proceeds to block 506 where the workload allocation system determines a relative priority of the workload identified in the workload request and workloads being performed by the server devices. In an embodiment, prior to the method 500, workloads may be prioritized relative to each other. For example, network administrator(s) or other user(s) may identify the priority of workloads that may be performed by the server devices 202a-202c by generating an application priority ranking of applications that may be provided by the client device(s) 208 and that may operate during the method 500 to transmit workload requests for the performance of workloads to the workload allocation system 206/300, and may store that application priority ranking in the workload allocation database 306 included in the workload allocation system 206/300. In a specific, simplified embodiment, network administrator(s) or other user(s) may identify a first application that may be provided by the client device(s) 208 and that may be associated with predominantly processing-intensive operations (and thus relatively higher power consumption), may identify a second application that may be provided by the client device(s) 208 and that may be associated with predominantly Input/Output (I/O)-intensive operations (and thus relatively lower power consumption), and may provide the application priority ranking with the first application ranked higher than the second application.

However, while a specific embodiment is provided, one of skill in the art in possession of the present disclosure will appreciate how applications may be ranked based on a variety of policy considerations in order to provide static application priority rankings, dynamic application priority rankings, and/or any other application priority ranking that would be apparent to one of skill in the art in possession of the present disclosure. For example, application groups may be defined based on business impact (e.g., application availability requirements that define an amount of time an application must be available to a user) and turn-around times (e.g., the time needed by an application to execute and produce result(s), which one of skill in the art in possession of the present disclosure will recognize is directly related to the performance of that application due to the application performance being proportional to the system resources available to that application), with business impacts further classified based on timescale (e.g., application priority may be variable with respect to the timeframe, with some applications (e.g., e-commerce applications experiencing peak usage on weekends, and financial applications experiencing peak usage during particular times during the week/month/quarter), which one of skill in the art in possession of the present disclosure will recognize allows for applications to be provided in the application groups and dynamically moved between application groups.

Furthermore, prior to the current performance of the method 500, the workload allocation engine 304 in the workload allocation system 206/300 may have previously allocated workloads to the server devices 202a, 202b, and up 202c, and as part of that workload allocation the workload allocation engine 304 in the workload allocation system 206/300 may have stored the workload allocation details for each workload allocation in the workload allocation database 306. As such, details associated with any previous workload allocation may be stored in the workload allocation database 306 and may, for any particular workload allocation, identify the application that requested that workload, details about the performance of that workload, the server device(s) performing that workload, and/or any other workload allocation details that one of skill in the art in possession of the present disclosure would recognize and allowing for the functionality discussed below.

Figure 7C:
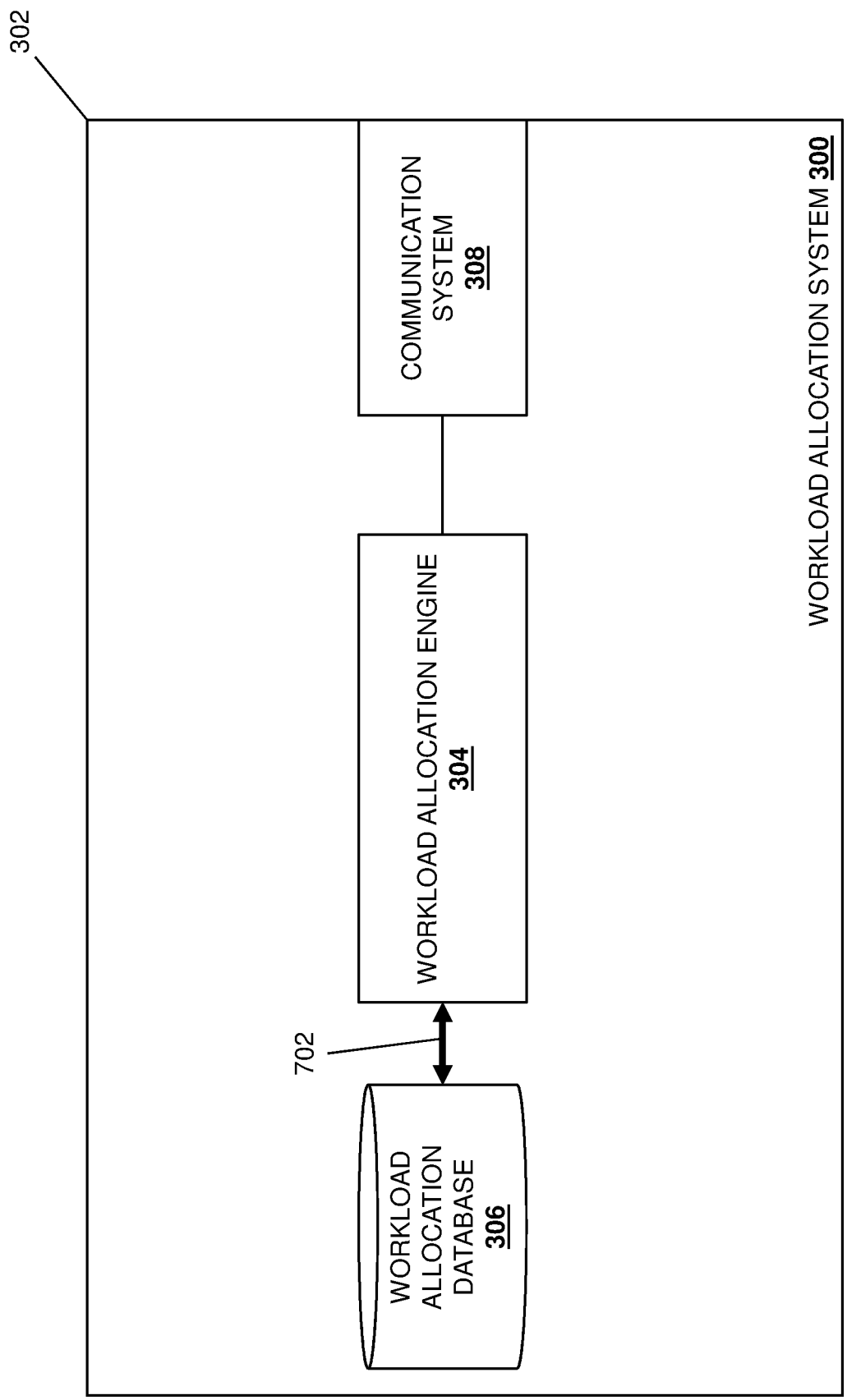
FIG. 7C is a schematic view illustrating an embodiment of the workload allocation system of FIG. 3 operating during the method of FIG. 5.

With reference to FIG. 7C, in an embodiment of block 506, the workload allocation engine 304 in the workload allocation system 206/300 may perform workload priority identification operations 702 that may include accessing its workload allocation database 306, identifying workload allocation details that describe the workloads currently being performed by the server devices 202a, 202b, and up 202c, and determining relative priorities of those workloads and the workload identified in the workload request received at block 504. Continuing with the example above in which workload priority is based on the priorities of applications that requested those workloads, at block 506 the workload priority identification operations 702 may include the workload allocation engine 304 in the workload allocation system 206/300 identifying the applications that requested the workloads currently being performed by the server devices 202a, 202b, and up 202c, and determining relative priorities of those applications and the application that requested the workload identified in the workload request received at block 504. As such, following block 506, the workload identified in the workload request received at block 504 may be ranked relative to each of the workloads that are currently being performed by the server devices 202a-202c (as will be appreciated by one of skill in the art in possession of the present disclosure, in situations where the server devices 202a-202c are not currently performing any workloads, the workload identified in the workload request received at block 504 may be provided the highest priority/rank due to it being the only workload currently needed by the client device(s) 208).

Figure 7D:
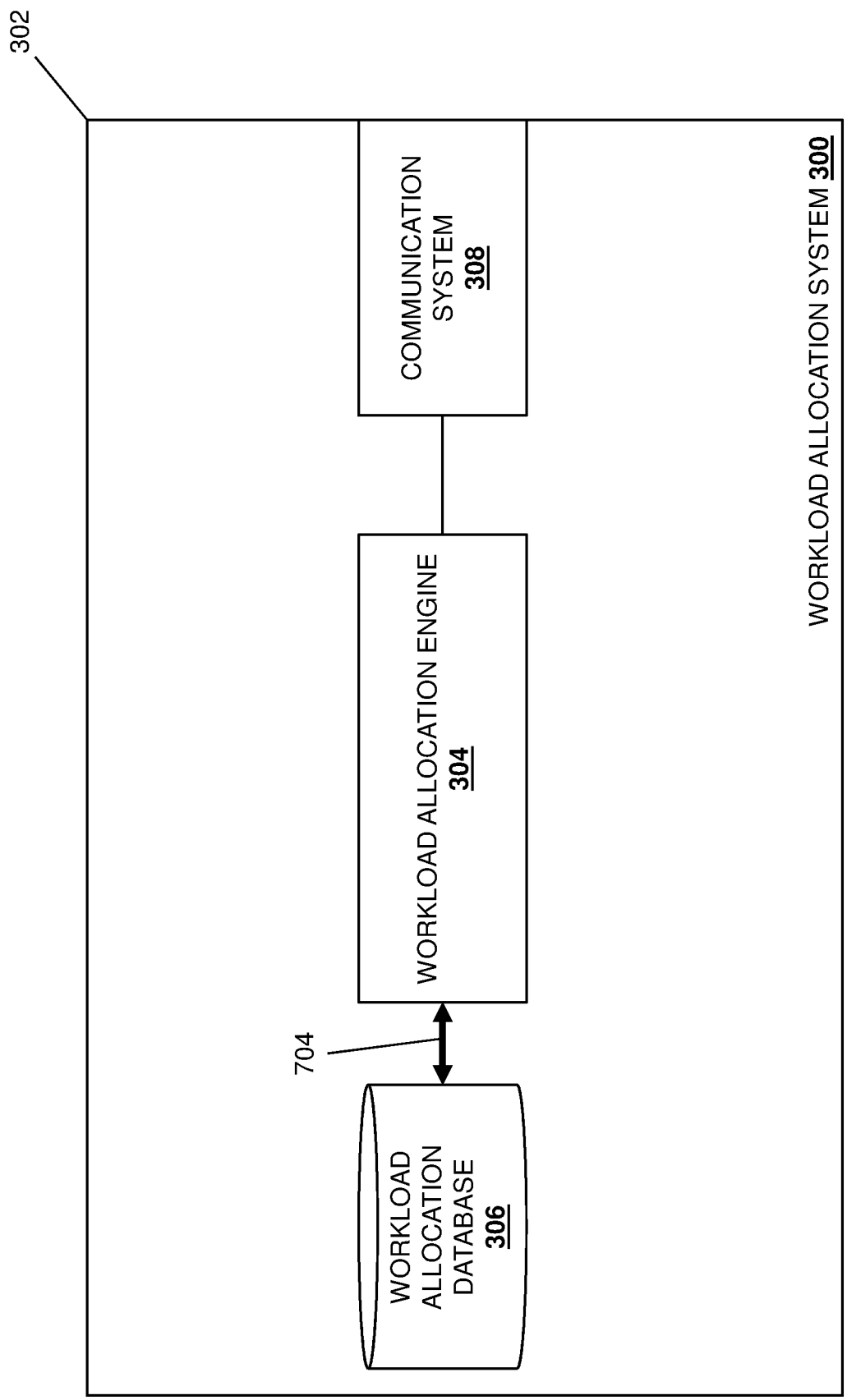
FIG. 7D is a schematic view illustrating an embodiment of the workload allocation system of FIG. 3 operating during the method of FIG. 5.
Figure 7E:
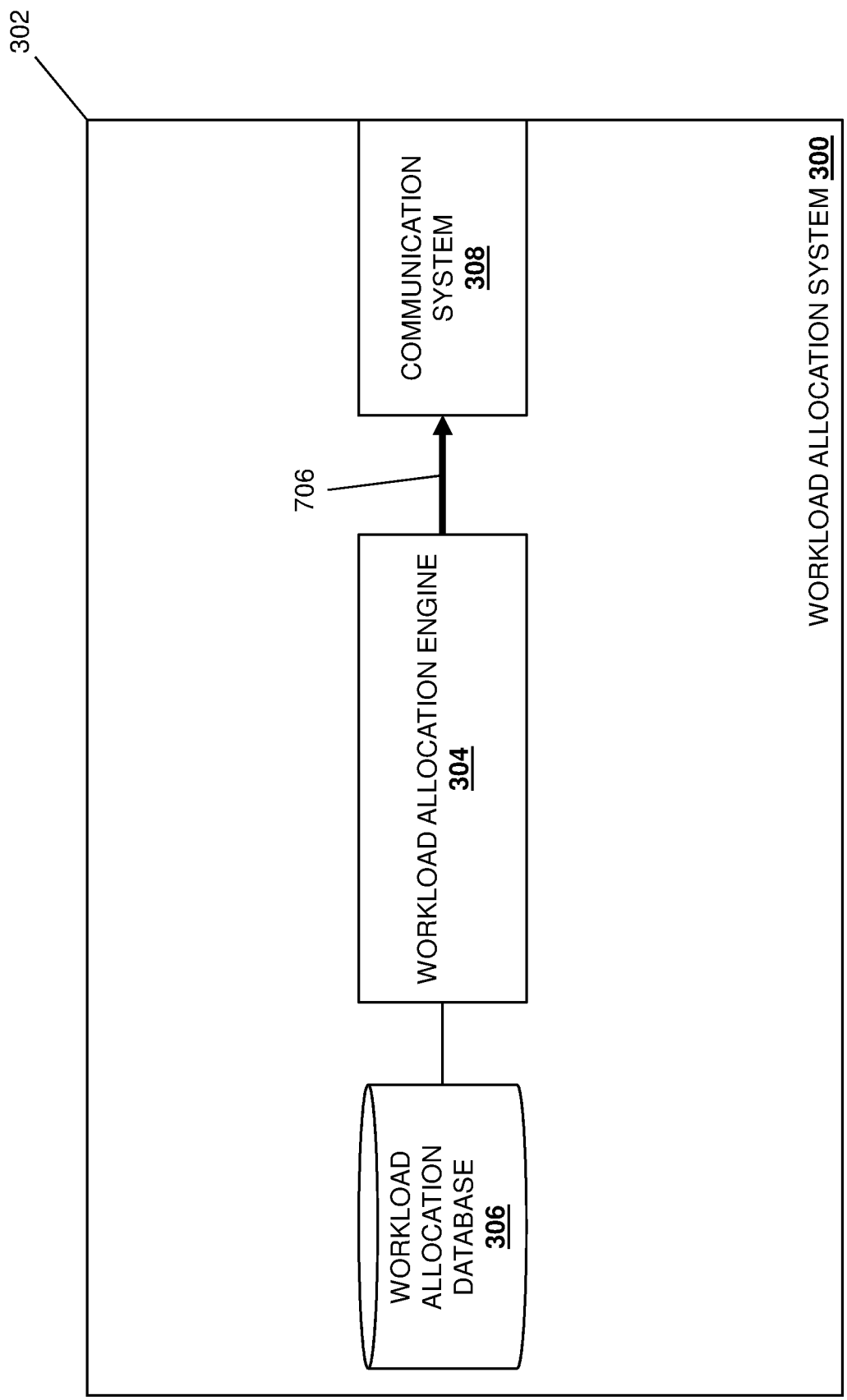
FIG. 7E is a schematic view illustrating an embodiment of the workload allocation system of FIG. 3 operating during the method of FIG. 5.

The method 500 then proceeds to block 508 where the workload allocation system identifies a first server device to perform the workload identified in the workload request based on the relative priority of that workload and the cooling-power-utilization-efficiency ranking of the server devices. With reference to FIG. 7D, in an embodiment of block 508, the workload allocation engine 304 in the workload allocation system 206/300 may perform server device identification operations 702 that may include accessing its workload allocation database 306 and identifying one of the server devices 202a, 202b, and up 202c for performing the workload identified in the workload request received at block 504 based on the relative priority of that workload determined at block 506 and the cooling-power-utilization-efficiency ranking of the server devices 202a-202c. To provide a specific, simplified example, at block 506 the workload allocation engine 304 in the workload allocation system 206/300 may determine that the workload identified in the workload request received at block 504 is prioritized below one other workload that is currently being performed by the server devices 202a-202c, and prioritized above the remaining workloads that are currently being performed by the server devices 202a-202c (i.e., the workload identified in the workload request received at block 504 is prioritized second relative to the workloads currently being performed by the server devices 202a-202c). Subsequently, at block 508, the workload allocation engine 304 in the workload allocation system 206/300 may determine which of the server devices 202a, 202b, and up 202c is ranked in the cooling-power-utilization-efficiency ranking as having the second most efficient cooling power utilization and, in response, will identify that server device for performing the workload identified in the workload request received at block 504 (e.g., assuming that workload will not cause that server device to exceed its maximum efficient cooling rate, discussed in further detail below).

In another specific example, the selection of the server device for performing the workload at block 508 may include the consideration of other factors. The table below illustrates an example of how server class, power consumption, airflow rate, and performance efficiency of different server devices may be co-related:

| SERVER CLASS | POWER CONSUMPTION (W) | AIRFLOW RATE (CFM) | PERFORMANCE EFFICIENCY (%) |
|---|---|---|---|
| 1-SOCKET SERVERS | 100 | X | 55 |
| 2-SOCKET SERVERS | 100 | X | 75 |
| HIGH-END | 100 | X | 80 |
| MID-RANGE | 100 | X | 50 |

In this example, if the total cooling capacity of the datacenter is y (KW), that total cooling capacity y corresponds to an total airflow rate of x (CFM), and the workload allocation that distributes workloads across the server devices in the datacenter may be based on the performance efficiency of those server devices and may be performed in order to ensure that the overall operational cost to generate the total airflow rate x (e.g., SUM[server device airflow rate]=x) remains within some budget while achieving maximum throughput via the server devices (e.g., the 50 W of power allocated to the two server devices from a total cooling capacity of 100 W in the specific simplified example provided above to allow up to a threshold amount of cooling in each of those server devices). For example, the high-end server devices in the table above have a performance efficiency of 80% (e.g., as specified via a vendor benchmarking specification suite such as a Standard Performance Evaluation Corporation (SPEC) tool), while mid-range server devices in the table above have a performance efficiency of 50% (e.g., as specified via a vendor benchmarking specification suite such as a SPEC tool). Furthermore, the applications provided by the client device(s) 208 may include a real-time weather forecasting application and a batch processing/non-real-time application that provides monthly inventors reports, with the real-time weather forecasting application given a higher application priority than the batch processing/non-real-time application.

Continuing with this example, it may be determined that a turn-around time for the real-time weather forecasting application when its workloads are performed by the high-end server devices is approximately 3 hours, and the turn-around time for the real-time weather forecasting application when its workloads are performed by the mid-range server devices is approximately 5 hours. Similarly, it may be determined that a turn-around time for the batch processing/non-real-time application when its workloads are performed by the high-end server devices is approximately 12 hours, and the turn-around time for the batch processing/non-real-time application when its workloads are performed by the mid-range server devices is approximately 20 hours. Furthermore, the power consumption by the high-end server devices to provide its required airflow rate when performing workloads for either of the real-time weather forecasting application or the batch processing/non-real-time application is approximately 50 W, while the power consumption by the mid-range server devices to provide its required airflow rate when performing workloads for either of the real-time weather forecasting application or the batch processing/non-real-time application is approximately 80 W. As such, at block 508, the high-end server devices may be selected for performing both the real-time weather forecasting application and the batch processing/non-real-time application in order to optimize the costs associated with cooling. However, while a few specific examples are provided, one of skill in the art in possession of the present disclosure will recognize that the server device may be selected for performing the workload at block 508 in a variety of manners based on the relative priority of that workload and the cooling-power-utilization-efficiency ranking of the server devices.

The method 500 may then proceed to optional block 510 where the workload allocation system causes a workload being performed by the first server device to be moved from the first server device. In an embodiment, at optional block 510 and in response to identifying a server device at block 508 that is already performing one or more workload(s), the workload allocation engine 304 in the workload allocation system 300 may operate to move that workload to a different server device (e.g., using VMOTION® available from VMWARE® of Palo Alto, California, United States). For example, a first workload may have been provided on the server device 202a during a previous performance of the method 500, and during a current performance of the method 500, a second workload may be identified that is a higher priority workload than the first workload (e.g., the second workload was provided by a second application that has a higher priority than a first application that provided the first workload), and the server device 202a may be identified as the server device for performing the second workload at block 508. As such, at optional block 510, the first workload may be moved to the server device 202b so that the second workload may be performed by the server device 202a (discussed below) and the first workload may be performed by the server device 202a. Thus, the allocation of a second workload for performance on a first server device may result in the iterative pre-emption of a first workload that is currently being performed by the first server device so that first workload may be performed by a second server device and the second workload may be performed by the first server device in order to ensure workloads are performed in the most cooling-power-utilization efficient manner.

Figure 7F:
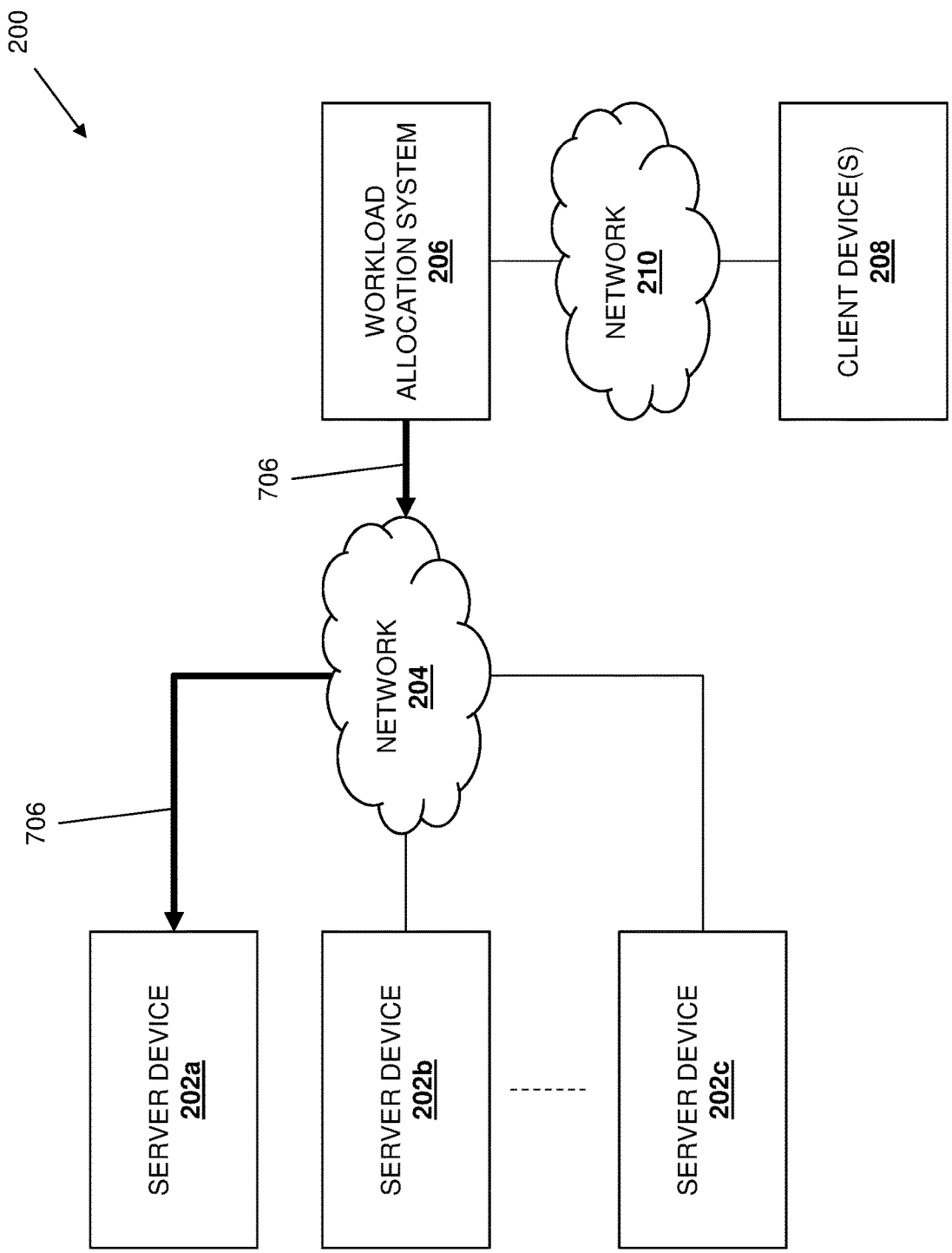
FIG. 7F is a schematic view illustrating an embodiment of the networked system of FIG. 2 operating during the method of FIG. 5.
Figure 7G:
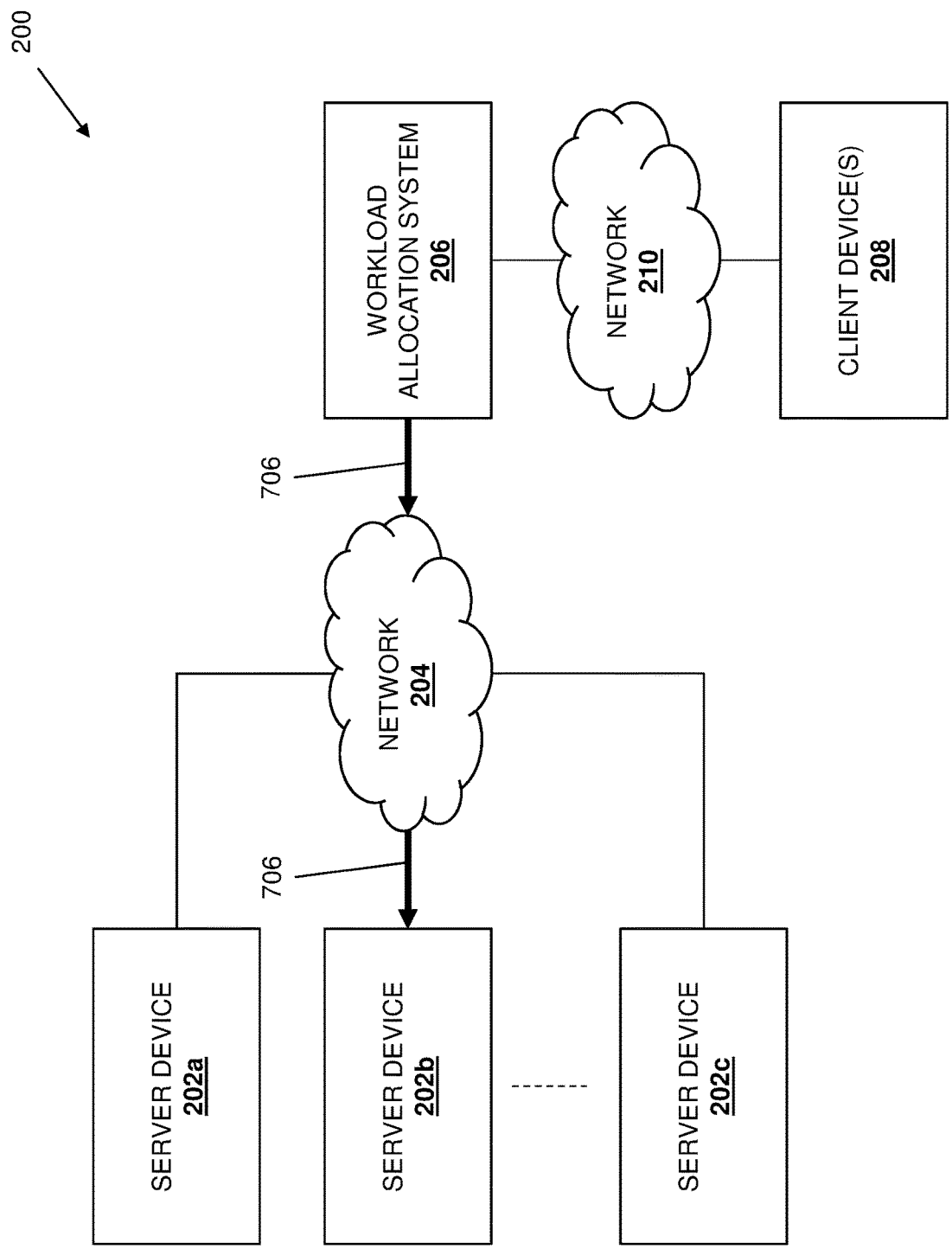
FIG. 7G is a schematic view illustrating an embodiment of the networked system of FIG. 2 operating during the method of FIG. 5.
Figure 7H:
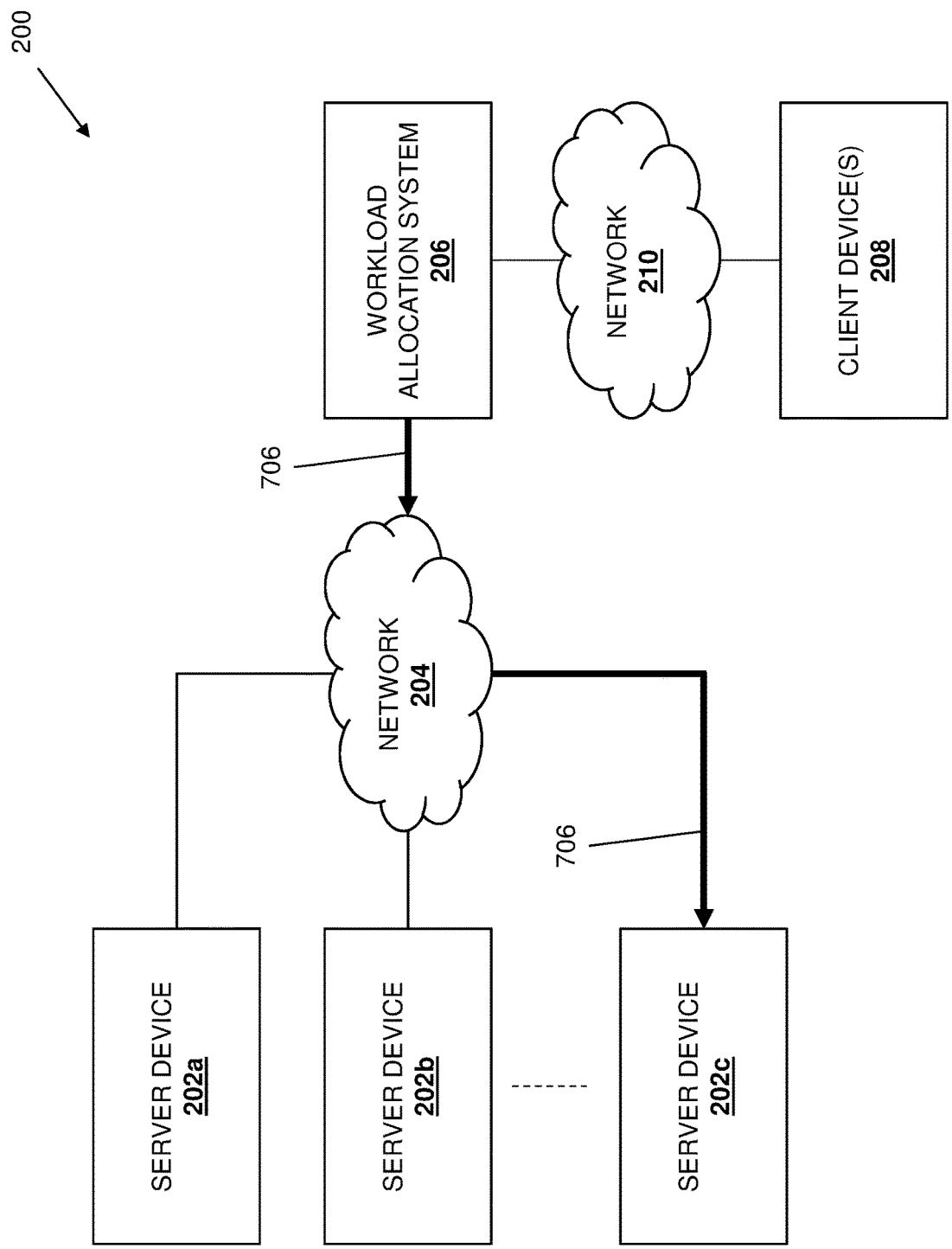
FIG. 7H is a schematic view illustrating an embodiment of the networked system of FIG. 2 operating during the method of FIG. 5.

The method 500 then proceeds to block 512 where the workload allocation system causes the first server device to perform the workload identified in the workload request. With reference to FIGS. 7E, 7F, 7G, and 7H, in an embodiment of block 512, the workload allocation engine 304 in the workload allocation system 206/300 may perform workload allocation operations 706 that include providing the workload via its communication system 308 for performance by one of the server devices 202a-202c. As such, FIG. 7F illustrates how the workload allocation system 206 may perform the workload allocation operations 706 to provide the workload identified in the workload request received at block 504 to the server device 202a, FIG. 7G illustrates how the workload allocation system 206 may perform the workload allocation operations 706 to provide the workload identified in the workload request received at block 504 to the server device 202b, FIG. 7H illustrates how the workload allocation system 206 may perform the workload allocation operations 706 to provide the workload identified in the workload request received at block 504 to the server device 202c, and one of skill in the art in possession of the present disclosure will appreciate that the workload allocation system 206 and any of the server devices 202a-202c may perform any of a variety workload allocation operations 706 that cause that server device to subsequently perform the workload identified in the workload request at block 504.

Figure 8A:
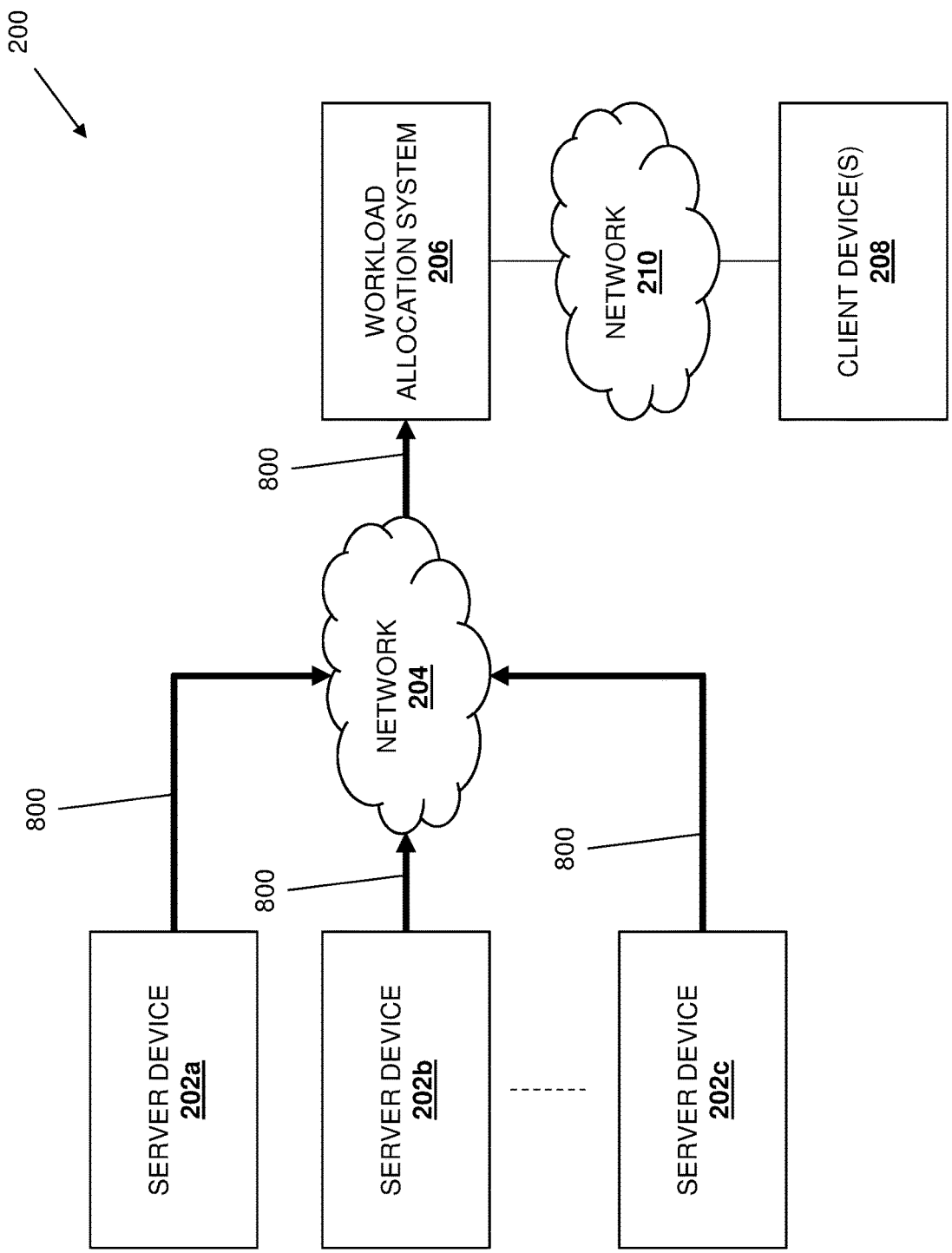
FIG. 8A is a schematic view illustrating an embodiment of the networked system of FIG. 2 operating during the method of FIG. 5.
Figure 8B:
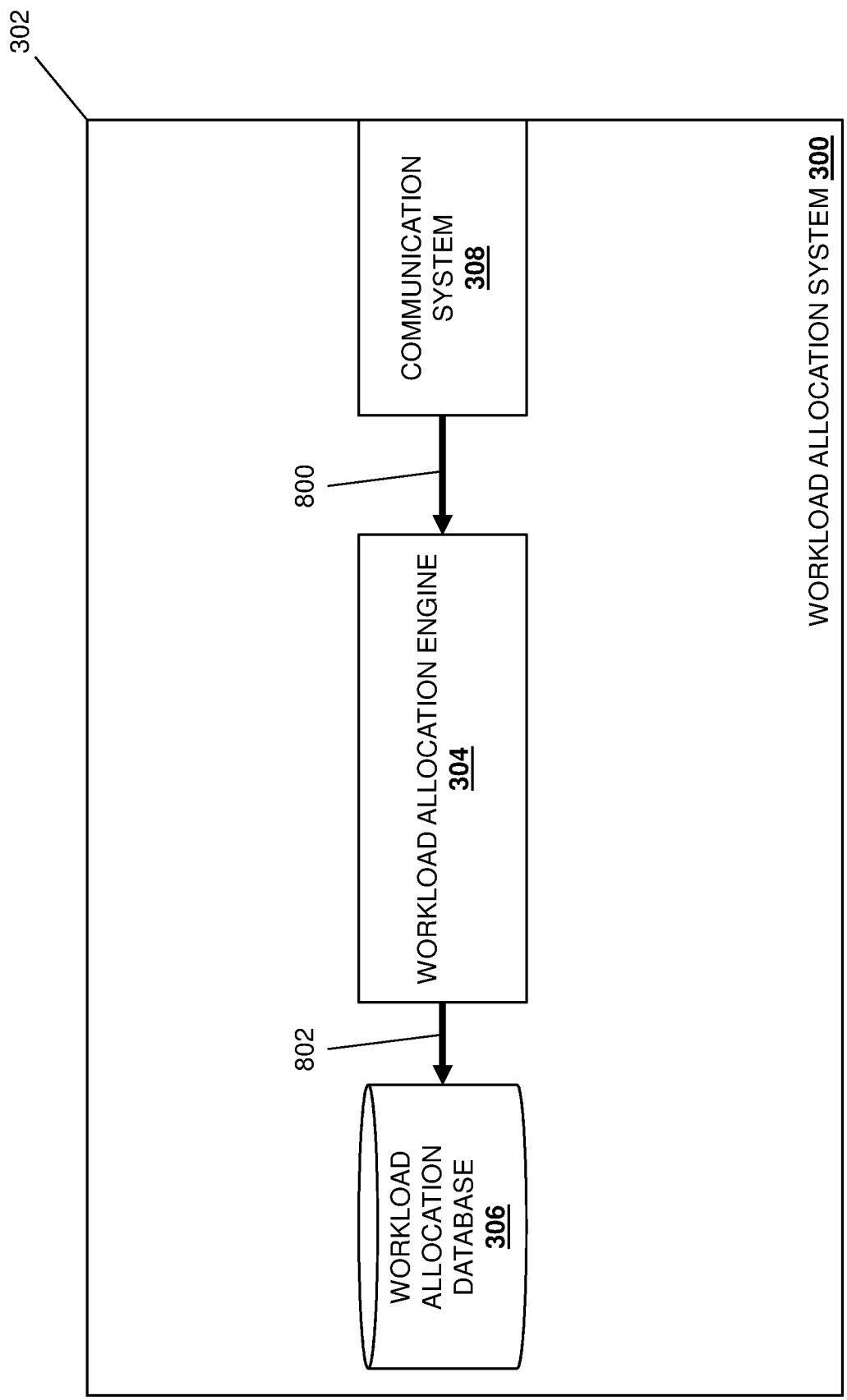
FIG. 8B is a schematic view illustrating an embodiment of the workload allocation system of FIG. 3 operating during the method of FIG. 5.

The method 500 then proceeds to block 514 where the workload allocation system monitors the server devices and updates the cooling-power-utilization-efficiency ranking. With reference to FIGS. 8A and 8B, in an embodiment of block 514, any of the server devices 202a-202c may operate to perform the workloads allocated to them and in response, the server engine 404 in those server devices 202a-202c/400 may perform workload performance reporting operations 800 that include transmitting workload reporting data (e.g., the telemetry data including the power consumption data, processor utilization data, memory utilization data, I/O utilization data, inlet temperature data, cooling system operation data, application load information, and/or other telemetry data discussed above) through its communication system 408 via the network 204 to the workload allocation system 206 such that the workload allocation engine 304 receives that workload reporting data via its communication system 308. In response to receiving the workload reporting data, the workload allocation engine 304 in the workload allocation system 206/300 may perform cooling-power-utilization-efficiency ranking update operations 802 that include using the workload reporting data received from the server devices 202a-202c to update the cooling-power-utilization-efficiency ranking of the server devices 202a-202c by, for example, modifying the relative ranking of any two or more server devices included in that cooling-power-utilization-efficiency ranking. As such, the cooling-power-utilization-efficiency ranking of the server devices 202a-202c may be dynamically re-calibrated based on continuous monitoring of power, thermal, and airflow rate telemetry attributes generated by the server devices 202a-202c.

The method 500 then returns to block 502. As such, workloads may be allocated to the server devices 202a, 202b, and up to 202c, based on the relative workload priorities of those workloads and the relative cooling-power-utilization efficiencies of the server devices, with workloads currently being performed by any of those server devices being moved to different service devices in order to optimize the power utilized to cool the server devices 202a-202c. To provide a specific, simplified example of the performance of the method 500, the server device 202a and the server device 202b in the networked system 200 may have their maximum efficient power consumption and maximum efficient airflow rate identified, and a first performance of the method 500 may include a first workload provided by a first application being allocated to the server device 202a that has a higher cooling-power-utilization efficiency ranking than the server device 202b. In one example, the subsequent performance of the first workload by the server device 202a may include the server device 202a operating above its maximum efficient airflow rate, which may result in a portion of the first workload being provided by the server device 202b in a manner that causes both the server devices 202a and 202b to operate at or below their maximum efficient airflow rates.

A second performance of the method 500 may then identify a second workload provided by a second application that has a higher application priority than the first application, which causes the first workload to be moved from the server device 202a to the server device 202b and the second workload being allocated to the server device 202a (i.e., due to the server device 202a having a higher cooling-power-utilization efficiency ranking than the server device 202b) such that the server device 202a performs the second workload and the server device 202b performs the first workload. In one example, the performance of the second workload by the server device 202a may include the server device 202a operating at or below its maximum efficient airflow rate, and the performance of the first workload by the server 202b may include the server device 202b operating above its maximum efficient airflow rate. In response to the server device 202b operating above its maximum efficient airflow rate, an alarm associated with a maximum efficient airflow rate threshold may be activated, and a user may be allowed to authorize the operation of the server device 202b above its maximum efficient airflow rate, cap the power consumption by the server device 202b (e.g., based on the cooling-power-utilization efficiency of that server device 202b, telemetry data received from that server device 202b, etc.), and/or perform other operations that would be apparent to one of skill in the art in possession of the present disclosure.

Thus, systems and methods have been described that provide for the allocation of workloads to server devices in consideration of the power utilized by those server devices to cool their components. For example, the cooling-power-consumption-based workload allocation system of the present disclosure includes a workload allocation system coupled to at least one client device and a plurality of server devices. The workload allocation system receives a first workload request that identifies a first workload from the at least one client device, and determines a first workload priority of the first workload relative to a second workload priority of each second workload being performed by the plurality of server devices. Based on the first workload priority of the first workload relative to the second workload priority of each second workload and a cooling-power-utilization-efficiency ranking of each of the plurality of server devices, the workload allocation system identifies a first server device included in the plurality of server devices for performing the first workload, and causes the first server device to perform the first workload. As such, workloads may be prioritized so that higher priority workloads are provided on the most cooling-power-utilization efficient server devices, which has been found to reduce the inefficient use of cooling power by the server devices and provide for more efficient/lower cost datacenter operation.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cooling-power-consumption-based workload allocation system, comprising:
  at least one client device;
  a plurality of server devices; and
  a workload allocation system coupled to the at least one client device and the plurality of server devices, wherein the workload allocation system is configured to:
    receive, from the at least one client device, a first workload request that identifies a first workload;
    determine a first workload priority of the first workload relative to a second workload priority of each second workload being performed by the plurality of server devices;
    identify, based on the first workload priority of the first workload relative to the second workload priority of each second workload and a cooling-power-utilization-efficiency ranking of each of the plurality of server devices that identifies a relative cooling-power-utilization-efficiency of each of the plurality of server devices in their utilization of a power to provide cooling for that server device, a first server device included in the plurality of server devices for performing the first workload based on the first server device having a first cooling-power-utilization-efficiency relative to at least one second cooling-power-utilization-efficiency of at least one second server device that is included in the plurality of server devices and that is performing each second workload; and cause the first server device to perform the first workload.

2. The system of claim 1, wherein first workload priority of the first workload is based on a first application priority of a first application that is being provided by the at least one client device and that transmitted the first workload request.

3. The system of claim 1, wherein the workload allocation system is configured to:

move, prior to causing the first server device to perform the first workload, the second workload being performed by the first server device to a second server device included in the plurality of server devices.

4. The system of claim 3, wherein the moving the second workload from the first server device to the second server device is performed in response to determining that first workload priority of the first workload is greater than the second workload priority of the second workload being performed by the first server device.

5. The system of claim 1, wherein the workload allocation system is configured to:

discover each of the plurality of server devices; and generate the cooling-power-utilization-efficiency ranking of each of the plurality of server devices.

6. The system of claim 1, wherein the workload allocation system is configured to:

monitor the plurality of server devices performing the first workload and the second workloads; and update, based on the monitoring of the plurality of server devices performing the first workload and the second workloads, the cooling-power-utilization-efficiency ranking of each of the plurality of server devices.

7. An Information Handling System (IHS), comprising:

a processing system; and a memory system that is coupled to the processing system and that includes instructions that, when executed by the processing system, cause the processing system to provide a workload allocation engine that is configured to:

receive, from at least one client device, a first workload request that identifies a first workload;

determine a first workload priority of the first workload relative to a second workload priority of each second workload being performed by a plurality of server devices;

identify, based on the first workload priority of the first workload relative to the second workload priority of each second workload and a cooling-power-utilization-efficiency ranking of each of the plurality of server devices that identifies a relative cooling-power-utilization-efficiency of each of the plurality of server devices in their utilization of a power to provide cooling for that server device, a first server device included in the plurality of server devices for performing the first workload based on the first server device having a first cooling-power-utilization-efficiency relative to at least one second cooling-power-utilization-efficiency of at least one second server device that is included in the plurality of server devices and that is performing each second workload; and cause the first server device to perform the first workload.

8. The IHS of claim 7, wherein first workload priority of the first workload is based on a first application priority of a first application that is being provided by the at least one client device and that transmitted the first workload request.

9. The IHS of claim 7, wherein the workload allocation engine is configured to:

move, prior to causing the first server device to perform the first workload, the second workload being performed by the first server device to a second server device included in the plurality of server devices.

10. The IHS of claim 9, wherein the moving the second workload from the first server device to the second server device is performed in response to determining that first workload priority of the first workload is greater than the second workload priority of the second workload being performed by the first server device.

11. The IHS of claim 7, wherein the workload allocation engine is configured to:

discover each of the plurality of server devices; and generate the cooling-power-utilization-efficiency ranking of each of the plurality of server devices.

12. The IHS of claim 7, wherein the workload allocation engine is configured to:

monitor the plurality of server devices performing the first workload and the second workloads; and update, based on the monitoring of the plurality of server devices performing the first workload and the second workloads, the cooling-power-utilization-efficiency ranking of each of the plurality of server devices.

13. The IHS of claim 7, wherein the cooling-power-utilization-efficiency ranking of each of the plurality of server devices identifies the relative cooling-power-utilization-efficiency of each of the plurality of server devices in their utilization of a maximum power to produce a maximum cooling airflow in that server device.

14. A method for cooling-power-utilization-based workload allocation, comprising:

receiving, by a workload allocation system from at least one client device, a first workload request that identifies a first workload;

determining, by the workload allocation system a first workload priority of the first workload relative to a second workload priority of each second workload being performed by a plurality of server devices;

identifying, by the workload allocation system based on the first workload priority of the first workload relative to the second workload priority of each second workload and a cooling-power-utilization-efficiency ranking of each of the plurality of server devices that identifies a relative cooling-power-utilization-efficiency of each of the plurality of server devices in their utilization of a power to provide cooling for that server device, a first server device included in the plurality of server devices for performing the first workload based on the first server device having a first cooling-power-utilization-efficiency relative to at least one second cooling-power-utilization-efficiency of at least one second server device that is included in the plurality of server devices and that is performing each second workload; and causing, by the workload allocation system, the first server device to perform the first workload.

15. The method of claim 14, wherein first workload priority of the first workload is based on a first application priority of a first application that is being provided by the at least one client device and that transmitted the first workload request.

16. The method of claim 14, further comprising:
moving, by the workload allocation system prior to causing the first server device to perform the first workload, the second workload being performed by the first server device to a second server device included in the plurality of server devices.

17. The method of claim 14, wherein the moving the second workload from the first server device to the second server device is performed in response to determining that first workload priority of the first workload is greater than the second workload priority of the second workload being performed by the first server device.

18. The method of claim 14, further comprising:
discovering, by the workload allocation system, each of the plurality of server devices; and
generating, by the workload allocation system, the cooling-power-utilization-efficiency ranking of each of the plurality of server devices.

19. The method of claim 18, further comprising:
monitoring, by the workload allocation system, the plurality of server devices performing the first workload and the second workloads; and
updating, by the workload allocation system based on the monitoring of the plurality of server devices performing the first workload and the second workloads, the cooling-power-utilization-efficiency ranking of each of the plurality of server devices.

20. The method of claim 14, wherein the cooling-power-utilization-efficiency ranking of each of the plurality of server devices identifies the relative cooling-power-utilization-efficiency of each of the plurality of server devices in their utilization of a maximum power to produce a maximum cooling airflow in that server device.

* * * * *